(12) United States Patent
Brosnan et al.

(10) Patent No.: US 11,504,783 B2
(45) Date of Patent: Nov. 22, 2022

(54) ABRASIVE ARTICLE AND METHOD OF FORMING

(71) Applicants: SAINT-GOBAIN ABRASIVES, INC., Worcester, MA (US); SAINT-GOBAIN ABRASIFS, Conflans-Sainte-Honorine (FR)

(72) Inventors: Maureen A. Brosnan, West Boylston, MA (US); Joseph L. Citrone, Natick, MA (US); Steffi Kaminski, Shrewsbury, MA (US); Charles W. Bleakney, IV, Northborough, MA (US); Yinggang Tian, Shrewsbury, MA (US); Ankit Thakur, Northborough, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 365 days.

(21) Appl. No.: 16/147,329

(22) Filed: Sep. 28, 2018

(65) Prior Publication Data
US 2019/0091782 A1    Mar. 28, 2019

Related U.S. Application Data

(60) Provisional application No. 62/564,583, filed on Sep. 28, 2017.

(51) Int. Cl.
*B23D 61/18*    (2006.01)
*B24B 27/06*    (2006.01)
(Continued)

(52) U.S. Cl.
CPC ........ *B23D 61/185* (2013.01); *B24B 27/0633* (2013.01); *B24D 11/001* (2013.01); *B24D 11/04* (2013.01); *B24D 18/0018* (2013.01)

(58) Field of Classification Search
CPC .... B23D 61/185; B24D 11/001; B24D 11/04; B24D 18/0018
See application file for complete search history.

(56) References Cited

U.S. PATENT DOCUMENTS 3,150,470 A    9/1964  Barron
3,835,598 A *  9/1974  Tobey .................. B23D 61/185
                                                  451/528

(Continued)

FOREIGN PATENT DOCUMENTS

CN    1238253 A    12/1999
CN    102665988 A    9/2012
(Continued)

OTHER PUBLICATIONS

International Search Report from PCT/US2018/053633 dated Jan. 28, 2019.

*Primary Examiner* — Pegah Parvini
(74) *Attorney, Agent, or Firm* — Abel Schillinger, LLP; Joseph P. Sullivan

(57) ABSTRACT

An abrasive article comprising a substrate having an elongated body and abrasive particles attached to the elongated body, the content of the abrasive particles oscillates along the length of the body between a minimum and maximum value, and the minimum content is greater than 0.

27 Claims, 8 Drawing Sheets

(51) Int. Cl.
*B24D 11/00* (2006.01)
*B24D 18/00* (2006.01)
*B24D 11/04* (2006.01)

(56) References Cited

U.S. PATENT DOCUMENTS

| | | |
|---|---|---|
| 5,143,523 A | 9/1992 | Matarrese |
| 5,863,305 A | 1/1999 | Beardsley et al. |
| 6,059,850 A | 5/2000 | Lise et al. |
| 6,186,870 B1 | 2/2001 | Wright et al. |
| 7,089,925 B1 | 8/2006 | Lin et al. |
| 9,199,357 B2 | 12/2015 | Sung et al. |
| 2009/0235591 A1 | 9/2009 | Yener et al. |
| 2011/0009039 A1* | 1/2011 | Balagani ............... B23D 65/00 451/533 |
| 2013/0084786 A1 | 4/2013 | Rehrig et al. |
| 2013/0273820 A1* | 10/2013 | Sung ..................... B01J 3/062 451/443 |
| 2013/0324021 A1 | 12/2013 | Ryan |
| 2014/0246005 A1 | 9/2014 | Lee et al. |

FOREIGN PATENT DOCUMENTS

| | | | |
|---|---|---|---|
| CN | 107208302 A | 9/2017 | |
| EP | 1371438 A1 | 12/2003 | |
| JP | 2000-271872 A | * 10/2000 | ............. B24D 11/00 |
| JP | 2003-340729 A | 12/2003 | |
| JP | 2004298969 A | 10/2004 | |
| JP | 2004-338023 A | 12/2004 | |
| JP | 2008526526 A | 7/2008 | |
| JP | 4203353 B2 | 12/2008 | |
| JP | 2009501637 A | 1/2009 | |
| JP | 2011-161613 A | 8/2011 | |
| JP | 2013-043268 A | 3/2013 | |
| WO | 2006071073 A1 | 7/2006 | |
| WO | 2006112670 A1 | 10/2006 | |
| WO | 2011020109 A2 | 9/2012 | |
| WO | 2014004982 A1 | 1/2014 | |
| WO | 2016013985 A1 | 1/2016 | |
| WO | 2016160357 A1 | 10/2016 | |
| WO | 2016/203135 A1 | 12/2016 | |
| WO | 2019068040 A1 | 4/2019 | |

* cited by examiner

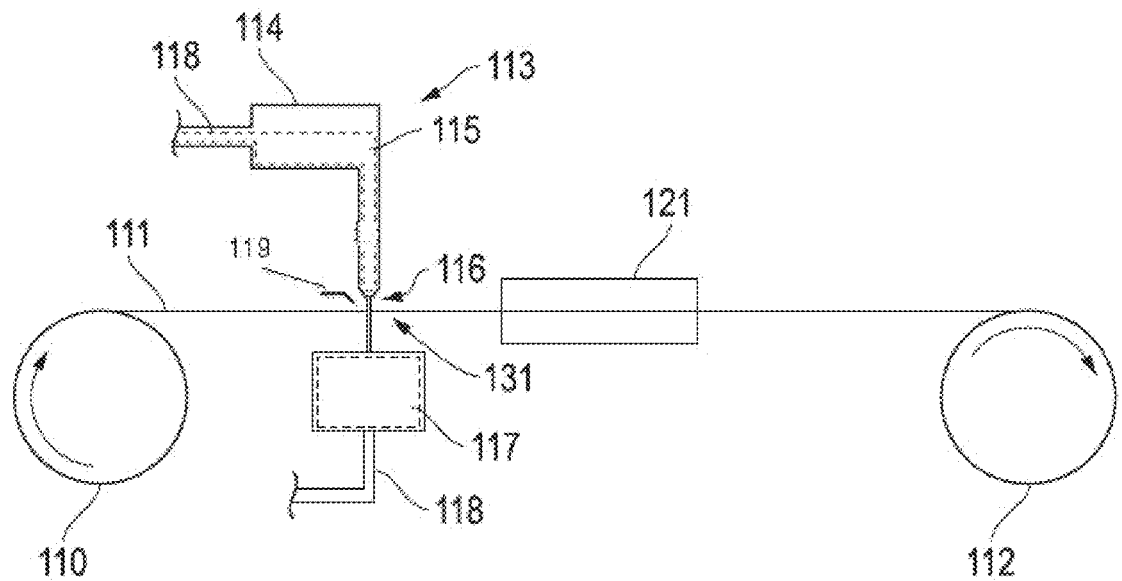
FIG. 1C
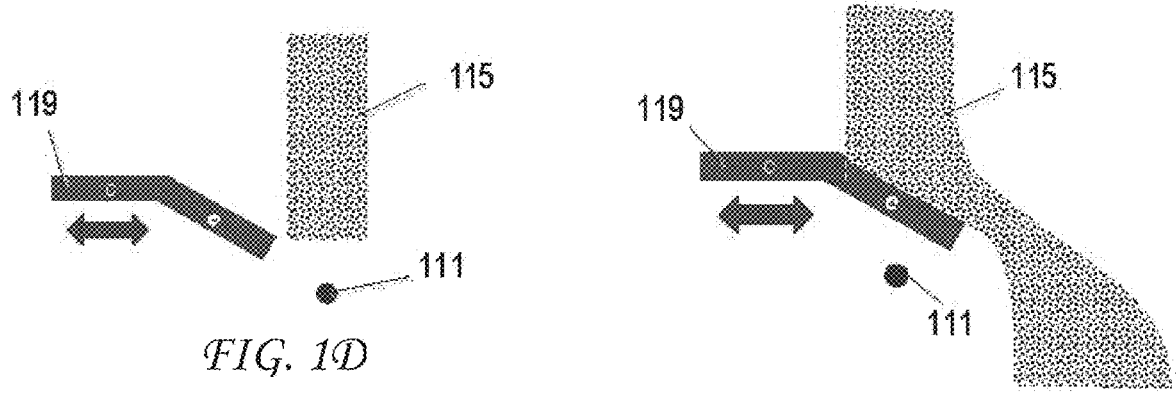
FIG. 1D
FIG. 1E

ABRASIVE ARTICLE AND METHOD OF FORMING

CROSS-REFERENCE TO RELATED APPLICATION

This application claims priority under 35 U.S.C. § 119(e) to U.S. Provisional Patent Application No. 62/564,583 entitled "ABRASIVE ARTICLE AND METHOD OF FORMING," by Maureen A. BROSNAN, et al., filed Sep. 28, 2017, which is assigned to the current assignee hereof and incorporated herein by reference in its entirety.

BACKGROUND

The following is directed to methods of forming abrasive articles, and particularly, single-layered abrasive articles.

DESCRIPTION OF THE RELATED ART

A variety of abrasive tools have been developed over the past century for various industries for the general function of removing material from a workpiece, including for example, sawing, drilling, polishing, cleaning, carving, and grinding. In particular reference to the electronics industry, abrasive tools suitable for slicing crystal ingots of material to form wafers is particularly pertinent. As the industry continues to mature, ingots have increasingly larger diameters, and it has become acceptable to use loose abrasives and wire saws for such works due to yield, productivity, affected layers, dimensional constraints and other factors.

Generally, wire saws are abrasive tools that include abrasive particles attached to a long length of wire that can be spooled at high speeds to produce a cutting action. While circular saws are limited to a cutting depth of less than the radius of the blade, wire saws can have greater flexibility allowing for cutting of straight or profiled cutting paths.

Various approaches have been taken in conventional fixed abrasive wire saws, such as producing these articles by sliding steel beads over a metal wire or cable, wherein the beads are separated by spacers. These beads may be covered by abrasive particles which are commonly attached by either electroplating or sintering. However, electroplating and sintering operations can be time consuming and thus costly ventures, prohibiting rapid production of the wire saw abrasive tool. Most of these wire saws have been used in applications, where kerf loss is not so dominating as in electronics applications, often to cut stone or marble. Some attempts have been made to attach abrasive particles via chemical bonding processes, such as brazing, but such fabrication methods reduce the tensile strength of the wire saw, and the wire saw becomes susceptible to breaking and premature failure during cutting applications under high tension. Other wire saws may use a resin to bind the abrasives to the wire. Unfortunately, the resin bonded wire saws tend to wear quickly and the abrasives are lost well before the useful life of the particles is realized, especially when cutting through hard materials.

Accordingly, the industry continues to need improved abrasive tools, particularly in the realm of wire sawing.

SUMMARY

According to a first aspect, an abrasive article includes a substrate comprising an elongated body and abrasive particles attached to the elongated body, wherein the content of the abrasive particles oscillates along the length of the body between a minimum and maximum value, wherein the minimum content is greater than 0.

In another aspect, an abrasive article includes a substrate comprising an elongated body and abrasive particles attached to the elongated body, wherein at least a portion of the abrasive particles have a varying content according to a predictable, undulating function between a local minimum and local maximum value.

In still another aspect, an abrasive article includes a substrate comprising an elongated body, a first abrasive region comprising abrasive particles overlying the elongated body, wherein the first abrasive region comprises a first content of abrasive particles (C1), wherein C1>0, a second abrasive region comprising abrasive particles overlying the elongated body, wherein the second abrasive region comprises a second content of abrasive particles (C2), wherein C2>0, and a content difference ($\Delta$C) between the first content and the second content of at least 14 counts.

For one other aspect, an abrasive article includes a substrate comprising an elongated body, and abrasive particles attached to the elongated body, wherein the abrasive particles define a varying content between a local minimum content and a local maximum content, and wherein the local minimum content is at least 5 counts and a content difference ($\Delta$C) between the local minimum content and the local maximum content is at least 14 counts.

In another aspect, a method for forming an abrasive article includes providing a substrate comprising an elongated body and depositing a slurry comprising a mixture of precursor material and abrasive particles onto the elongated body to form a coated substrate, wherein during depositing the content of abrasive particles deposited onto the substrate is varied.

BRIEF DESCRIPTION OF THE DRAWINGS

The present disclosure may be better understood, and its numerous features and advantages made apparent to those skilled in the art by referencing the accompanying drawings.

FIG. 1C includes an illustration of a process for forming an abrasive article in accordance with an embodiment.

FIG. 1D includes an illustration of a process for forming an abrasive article in accordance with an embodiment.

FIG. 1E includes an illustration of a process for forming an abrasive article in accordance with an embodiment.

DETAILED DESCRIPTION

The following is directed to abrasive articles, and particularly abrasive articles suitable for abrading and sawing through workpieces. In particular instances, the abrasive articles herein can form wire saws, which may be used in processing of sensitive, crystalline materials in the electronics industry, optics industry, and other associated industries.

Figure 1A:
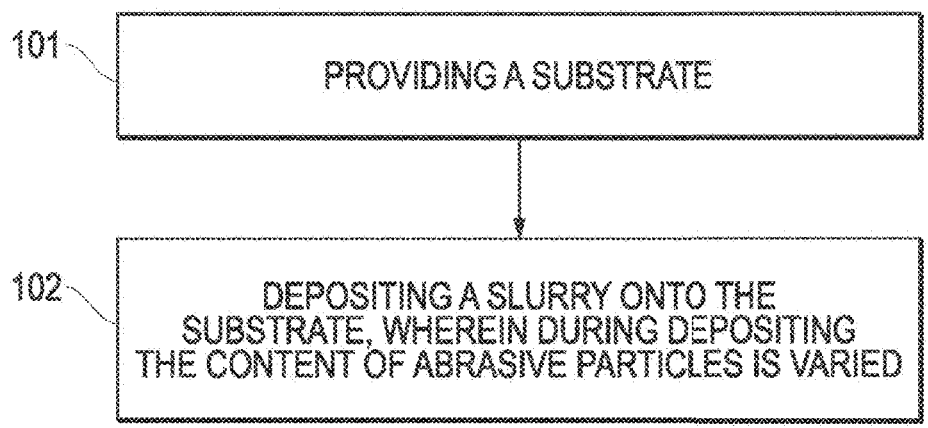
FIG. 1A includes a flow chart providing a process for forming an abrasive article in accordance with an embodiment.

FIG. 1A includes a flow chart providing a process of forming an abrasive article in accordance with an embodiment. The process can be initiated at step 101 by providing a substrate. The substrate can provide a surface for affixing abrasive materials thereto, thus facilitating the abrasive capabilities of the abrasive article.

In accordance with an embodiment, the process of providing a substrate can include a process of providing a substrate having an elongated body. In particular instances, the elongated body can have an aspect ratio of length:width of at least 10:1. In other embodiments, the elongated body can have an aspect ratio of at least about 100:1, such as at least 1000:1, or even at least about 10,000:1. The length of the substrate can be the longest dimension measured along a longitudinal axis of the substrate. The width can be a second longest (or in some cases smallest) dimension of the substrate measured perpendicular to the longitudinal axis.

Furthermore, the substrate can be in the form of elongated body having a length of at least about 50 meters. In fact, other substrates can be longer, having an average length of at least about 100 meters, such as at least about 500 meters, at least about 1,000 meters, or even at least about 10,000 meters.

Furthermore, the substrate can have a width that may not be greater than about 1 cm. In fact, the elongated body can have an average width of not greater than about 0.5 cm, such as not greater than about 1 mm, not greater than about 0.8 mm, or even not greater than about 0.5 mm. Still, the substrate may have an average width of at least about 0.01 mm, such as at least about 0.03 mm. It will be appreciated that the substrate can have an average width within a range between any of the minimum and maximum values noted above.

In certain embodiments, the elongated body can be a wire having a plurality of filaments braided together. That is, the substrate can be formed of many smaller wires wound around each other, braided together, or fixed to another object, such as a central core wire. Certain designs may utilize piano wire as a suitable structure for the substrate. For example, the substrate can be a high strength steel wire having a break strength of at least about 3 GPa. The substrate break strength can be measured by ASTM E-8 for tension testing of metallic materials with capstan grips. The wire may be coated with a layer of a particular material, such as a metal, including for example, brass. Still, in other instances, the wire may be essentially free of any coatings on the exterior surface.

The elongated body can have a certain shape. For example, the elongated body can have a generally cylindrical shape such that it has a circular cross-sectional contour. In using elongated bodies having a circular cross-sectional shape, as viewed in a plane extending transversely to the longitudinal axis of the elongated body.

The elongated body can be made of various materials, including for example, inorganic materials, organic materials (e.g., polymers and naturally occurring organic materials), or any combination thereof. Suitable inorganic materials can include ceramics, glasses, metals, metal alloys, cermets or any combination thereof. In certain instances, the elongated body can be made of a metal or metal alloy material. For example, the elongated body may be made of a transition metal or transition metal alloy material and may incorporate elements of iron, nickel, cobalt, copper, chromium, molybdenum, vanadium, tantalum, tungsten, or any combination thereof.

Suitable organic materials can include polymers, which can include thermoplastics, thermosets, elastomers or any combination thereof. Particularly useful polymers can include polyimides, polyamides, resins, polyurethanes, polyesters, and the like. It will further be appreciated that the elongated body can include natural organic materials, for example, rubber.

Furthermore, the abrasive articles herein can form a substrate having a certain resistance to fatigue. For example, the substrates can have an average fatigue life of at least 300,000 cycles as measured through a Rotary Beam Fatigue Test or a Hunter Fatigue Test. The test can be a MPIF Std. 56. The rotary beam fatigue test measures the number of cycles up to wire break at designated stress (e.g. 700 MPa), i.e. constant stress or the stress under which the wire was not ruptured in a cyclic fatigue test with a number of repeating cycles of up to $10^6$ (e.g. stress represents fatigue strength). In other embodiments, the substrate may demonstrate a higher fatigue life, such as least about 400,000 cycles, at least about 450,000 cycles, at least about 500,000 cycles, or even at least about 540,000 cycles. Still, the substrate may have a fatigue life that is not greater than about 2,000,000 cycles.

After providing a substrate at step 101, the process can continue at step 102, which includes depositing a slurry onto the elongated body of the substrate. In one aspect, the slurry can include abrasive particles and during the process of depositing the slurry onto the substrate, the content of the abrasive particles can be varied. In such instances, the process facilitates formation of an abrasive article wherein the content of the abrasive particles along the length of the substrate can vary. The slurry can be a mixture including abrasive particle and a precursor material that may form a tacking layer or bond material after further processing. The slurry may include other materials, such as additives, like stabilizers, and the like. The chemistry of the slurry and the presence of certain additives may depend upon the nature of the process used to attach the abrasive particles to the substrate.

Figure 1B:
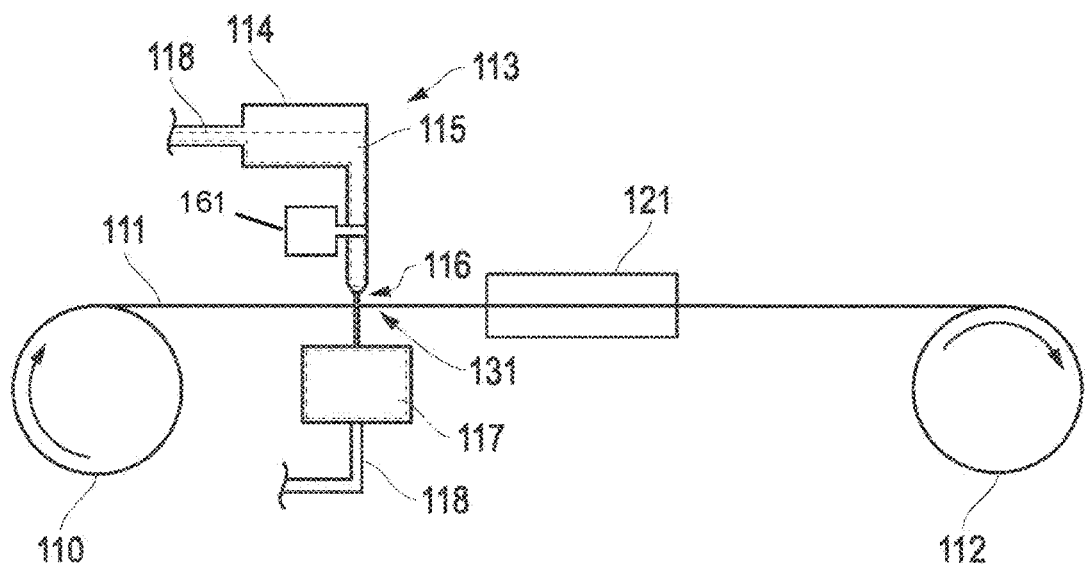
FIG. 1B includes an illustration of a process for forming an abrasive article in accordance with an embodiment.

To facilitate processing and formation of the abrasive article, the substrate may be connected to a spooling mechanism. Referring to FIG. 1B, the substrate 111 can be translated between a feed spool 110 and a receiving spool 112. The translation of the substrate 111 between the feed spool 110 and the receiving spool 112 can facilitate continuous processing, such that for example, the substrate 111 may be translated through desired forming processes to form the component layers of the finally-formed abrasive article while being translated from the feed spool 110 to the receiving spool 112.

In further reference to the process of providing a substrate, it will be appreciated that the substrate 111 can be spooled from a feed spool 110 to a receiving spool 112 at a particular rate to facilitate processing. For example, the substrate 111 can be spooled at a rate of not less than about 5 m/min from the feed spool 110 to the receiving spool 112. In other embodiments, the rate of spooling can be greater, such that it is at least about 8 m/min or at least about 10 m/min or at least about 12 m/min or at least about 15 m/min or at least about 20 m/min or at least about 25 m/min or at least about 30 m/min. In particular instances, the spooling rate may be not greater than about 500 m/min, such as not greater than about 200 m/min or not greater than 100 m/min or not greater than 70 m/min. The rate of spooling can be within a range between any of the minimum and maximum values noted above. It will be appreciated the spooling rate can represent the rate at which the finally-formed abrasive article can be formed.

In certain instances, the substrate 111 can include one or more optional barrier layers overlying the exterior surface of the substrate. According to one aspect, the barrier layer can be overlying the exterior surface of a substrate 111, such that it may be in direct contact with the exterior (i.e., peripheral) surface of the substrate 11, and more particularly, can be bonded directly to the exterior surface of the substrate 111. In one embodiment, the barrier layer can be bonded to the exterior surface of the substrate 111 and may define a diffusion bond region between the barrier layer and the substrate 111, characterized by an interdiffusion of at least one metal element of the substrate 111 and one element of the barrier layer. In one particular embodiment, the barrier layer can be disposed between the substrate 111 and other overlying layers, including for example, a tacking layer, a bonding layer, a coating layer, a layer of one or more types of abrasive particles, or a combination thereof.

The process of providing a substrate 111 having a barrier layer can include sourcing such a construction or fabricating such a substrate 111 and barrier layer construction. The barrier layer can be formed through various techniques, including for example, a deposition process. Some suitable deposition processes can include, printing, spraying, dip coating, die coating, plating (e.g., electrolytic or electroless) or any combination thereof. In accordance with an embodiment, the process of forming the barrier layer can include a low temperature process. For example, the process of forming the barrier layer can be conducted at a temperature of not greater than about 400° C., such as not greater than about 375° C., not greater than about 350° C., not greater than about 300° C., or even not greater than about 250° C. Furthermore, after forming the barrier layer it will be appreciated that further processing can be undertaken including for example cleaning, drying, curing, solidifying, heat-treating or any combination thereof. The barrier layer can serve as a barrier to chemical impregnation of the core material by various chemical species (e.g., hydrogen) in subsequent plating processes. Moreover, the barrier layer may facilitate improved mechanical durability.

In one embodiment, the barrier layer can be a single layer of material. The barrier layer can be in the form of a continuous coating, overlying the entire peripheral surface of the substrate 111. The barrier material can include an inorganic material, such as a metal or metal alloy material. Some suitable materials for use in the barrier layer can include transition metal elements, including but not limited to tin, silver, copper, zinc, nickel, titanium, lead, or any combination thereof. In another embodiment, the barrier layer may include brass. In one embodiment, the barrier layer can be a single layer of material consisting essentially of tin. In one particular instance, the barrier layer can contain a continuous layer of tin having a purity of at least 99.99% tin. Notably, the barrier layer can be a substantially pure, non-alloyed material. That is, the barrier layer can be a metal material (e.g., tin) made of a single metal material.

In other embodiments, the barrier layer can be a metal alloy. For example, the barrier layer can include a tin alloy, such as a composition including a combination of tin and another metal, including transition metal species such as copper, silver, and the like. Some suitable tin-based alloys can include tin-based alloys including silver, and particularly Sn96.5/Ag3.5, Sn96/Ag4, and Sn95/Ag5 alloys. Other suitable tin-based alloys can include copper, and particularly including Sn99.3/Cu0.7 and Sn97/Cu3 alloys. Additionally, certain tin-based alloys can include a percentage of copper and silver, including for example, Sn99/Cu0.7/Ag0.3, Sn97/Cu2.75/Ag0.25 and, Sn95.5/Ag4/Cu0.5 alloys. In still another embodiment, the barrier layer can include a metal alloy including a combination of copper and nickel, and more specifically may include a metal alloy consisting essentially of copper and nickel.

In another aspect, the barrier layer can be formed from a plurality of discrete layers, including for example, at least two discrete layers. For example, the barrier layer can include an inner layer and an outer layer overlying the inner layer. According to an embodiment, the inner layer and outer layer can be directly contacting each other, such that the outer layer is directly overlying the inner layer and joined at an interface. Accordingly, the inner layer and outer layer can be joined at an interface extending along the length of the substrate.

In one embodiment, the inner layer can include any of the characteristics of the barrier layer described above. For example, the inner layer can include a continuous layer of material including tin, copper, nickel, or a combination thereof. Moreover, the inner layer and outer layer can be formed of different materials relative to each other. That is, for example, at least one element present within one of the layers can be absent within the other layer. In one particular embodiment, the outer layer can include an element that is not present within the inner layer.

The outer layer can include any of the characteristics of the barrier layer described above. For example, the outer layer can be formed such that it includes an inorganic material, such as a metal or a metal alloy. More particularly, the outer layer can include a transition metal element. For example, in one certain embodiment, the outer layer can include nickel. In another embodiment, the outer layer can be formed such that it consists essentially of nickel.

In certain instances, the outer layer can be formed in the same manner as the inner layer, such as a deposition process. However, it is not necessary that the outer layer be formed in the same manner as the inner layer. In accordance with an embodiment, the outer layer can be formed through a deposition process including plating, spraying, printing, dipping, die coating, deposition, or any combination thereof. In certain instances, the outer layer of the barrier layer can be formed at relatively low temperatures, such as temperatures not greater than about 400° C., not greater than about 375° C., not greater than about 350° C., not greater than about 300° C., or even not greater than about 250° C. According to one particular process, the outer layer can be formed though a non-plating process, such as die coating. Moreover, the processes used to form the outer layer may include other methods including for example heating, curing, drying, or any combination thereof. It will be appreciated that formation of the outer layer in such a manner may facilitate limiting the impregnation of unwanted species within the core and/or inner layer.

In accordance with an embodiment, the inner layer of the barrier layer can be formed to have a particular average thickness suitable for acting as a chemical barrier layer. For example, the barrier layer can have an average thickness of at least about 0.05 microns, such as least about 0.1 microns, at least about 0.2 microns, at least about 0.3 micron, or even at least about 0.5 microns. Still, the average thickness of the inner layer may be not greater than about 8 microns, such as not greater than about 7 microns, not greater than about 6 microns, not greater than about 5 microns, or even not greater than about 4 microns. It will be appreciated that the inner layer can have an average thickness within a range between any of the minimum and maximum thicknesses noted above.

The outer layer of the barrier layer can be formed to have a particular thickness. For example, in one embodiment, the average thickness of the outer layer can be at least about 0.05 microns, such as least about 0.1 microns, at least about 0.2 microns, at least about 0.3 micron, or even at least about 0.5 microns. Still, in certain embodiments, the outer layer can have an average thickness that is not greater than about 12 microns, not greater than about 10 microns, not greater than about 8 microns, not greater than about 7 microns, not greater than about 6 microns, not greater than about 5 microns, not greater than about 4 microns, or even not greater than about 3 microns. It will be appreciated that the outer layer of the barrier layer can have an average thickness within a range between any of the minimum and maximum thicknesses noted above.

Notably, in at least one embodiment, the inner layer can be formed to have a different average thickness than the average thickness of the outer layer. Such a design may facilitate improved impregnation resistance to certain chemical species while also providing suitable bonding structure for further processing. For example, in other embodiments the inner layer can be formed to have an average thickness that is greater than the average thickness of the outer layer. However, in alternative embodiments, the inner layer may be formed to have an average thickness so that it is less than the average thickness of the outer layer.

According to one particular embodiment, the barrier layer can have a thickness ratio $[t_i:t_o]$ between an average thickness of the inner layer $(t_i)$ and an average thickness of the outer layer $(t_o)$ that can be within a range between about 3:1 and about 1:3. In other embodiments, the thickness ratio can be within a range between about 2.5:1 and about 1:2.5, such as within a range between about 2:1 and about 1:2, within a range between about 1.8:1 and about 1:1.8, within a range between about 1.5:1 and about 1:1.5, or even within a range between about 1.3:1 and about 1:1.3.

Notably, the barrier layer (including at least the inner layer and outer layer) can be formed to have an average thickness that is not greater than about 10 microns. In other embodiments, the average thickness of the barrier layer may be less, such as not greater than about 9 microns, not greater than about 8 microns, not greater than about 7 microns, not greater than about 6 microns, not greater than about 5 microns, or even not greater than about 3 microns. Still, the average thickness of the barrier layer can be at least about 0.05 microns, such as least about 0.1 microns, at least about 0.2 microns, at least about 0.3 micron, or even at least about 0.5 microns. It will be appreciated that the barrier layer can have an average thickness within a range between any of the minimum and maximum thicknesses noted above.

Still, in another embodiment, the substrate may not necessarily include a barrier layer or any coatings on the exterior surface. For example, the substrate may be essentially free of a barrier layer, wherein the substrate is essentially free of a barrier layer. In at least one embodiment, the substrate can be an uncoated wire prior to translating the substrate through a mixture, which will be described herein at step 102. More particularly, the substrate can be a metal wire that is essentially free of any coating layers on an exterior surface prior to the process of translating the wire through a mixture as described in step 102.

Referring again to FIG. 1B, the process of depositing a slurry 115 onto the substrate 111 can include utilizing a slurry 115 containing abrasive particles and a precursor material wherein the precursor material can form a tacking layer or bonding layer of the finally-formed abrasive article. As further illustrated in the embodiment of FIG. 1B, the deposition process can include translating the substrate 111 through a deposition region 131, wherein the slurry is flowing from a reservoir 114 that contains the slurry 115 to a basin 117. The basin 117 can be positioned and configured to catch excess slurry that is not attached to the substrate 111 in the deposition region 131. As illustrated in FIG. 1B, the substrate 111 can be translated in a substantially horizontal direction as it passes through a stream of the slurry 115 in the deposition region 131 that is fed from the reservoir 114 to the basin 117 via gravity. While the illustrated embodiment of FIG. 1B demonstrates the substrate 111 being translated substantially horizontally through the deposition region 131, it will be appreciated that other embodiments may utilize alternative orientations, including for example, vertical translation or translation of the substrate 111 at a slant between a horizontal or vertical direction.

The reservoir 114 can include a deposition port 116 configured to allow for flow of the slurry 115 from the reservoir 114 and onto the substrate 111 in the deposition region 131. In one embodiment, the deposition port 116 may be controllable, such that the size of the opening through which the slurry 115 flows can be changed.

While not illustrated in the embodiment of FIG. 1B, it will be appreciated that the reservoir 114 can include a plurality of deposition ports. In such configurations, the reservoir 114 can include more than one, such as at least 2 or at least 3 deposition ports configured for the flow of the slurry 115 therethrough. Multiple deposition ports may be used to provide alternative flow rates of the slurry 115 in various places within the deposition region 131. Additionally, a plurality of deposition ports allows a manufacturer to select which ports may be opened for the flow of slurry 115 therethrough and provide greater flexibility to the manufacturing process.

As further illustrated, the basin 117 can include a recycler 118, wherein the recycler 118 can be attached to a portion of the basin 117 and the reservoir 114 and configured to facilitate the return of unused slurry from the basing 117 to the reservoir 114. It will be appreciated that a pump or other object may be used to generate an external force to assist with the movement of the slurry 115 through the recycler 118.

In another embodiment, a pump 161 or other similar device can be connected to the reservoir 114 and assist with controlling the flow rate of the slurry 115 from the reservoir 114. The pump 161 may be a computer controlled device that can be configured to control the force exerted on the slurry 115 in the reservoir 114 and facilitate control of the slurry flow rate from the reservoir 114.

According to one embodiment, the process of depositing the slurry 115 onto the substrate 111 can include varying the content of abrasive particles deposited on the substrate 111. The content of abrasive particles can be varied by controlling at least one deposition characteristic selected from the group consisting of the slurry 115 flow rate, the opening size of the deposition port 116, the volume of slurry 115 deposited per unit of time, the number of deposition ports actively depositing slurry, direction of the deposition ports, the translating speed of the substrate 111, or any combination thereof. According to one embodiment, one may vary the content of abrasive particles attaching to the substrate 11 by varying the amount of slurry 115 that contacts the substrate 111 at any given moment in the deposition region 131. In a particular embodiment, the content of abrasive particles can be varied by changing the flow rate of the slurry between a minimum and maximum value to alter the content of abrasive particles attached to the substrate.

In a particular embodiment, the content of abrasive particles can be varied by changing the direction of the slurry to deflect slurry away from the substrate periodically to alter the content of abrasive particles attached to the substrate. FIG. 1C includes an illustration showing the same configurations of the process of depositing a slurry 115 onto the substrate 111 as in FIG. 1B, however, the pump 161 is removed and a deflection plate 119 is used to vary the content of abrasive particles on the substrate. It will be appreciated that the process of FIG. 1C and components described in reference to FIG. 1C may have any of the characteristics described herein with reference to corresponding components in FIG. 1B.

The deflection plate 119 and the mechanism utilized to deflect the flow of slurry 115 away from the substrate 111 is shown in FIGS. 1D-1E. The deflection plate 119 may be configured to control the direction of the flow of the slurry 115 exiting the reservoir 114 through the deposition port 116. The deflection plate 119 may be configured to be attached to or be mounted from the reservoir 114 such that it is adjacent to the flow of the slurry 115 exiting the reservoir 114. In still another embodiment, the deflection plate 119 is mounted on a base (not shown). The base may be self-adjusted in a linear motion to allow the deflection plate 119 to move in and out of the flow of the slurry 115 exiting the reservoir 114 such that the flow of the slurry 115 exiting the reservoir 114 is deflected away from the substrate 111. In still another embodiment, a mechanism of rotatory or swinging motion may be applied to the deflection plate 119 to adjust its position relative to the flow of the slurry 115 exiting the reservoir 114 such that the flow of the slurry 115 exiting the reservoir 114 is deflected away from the substrate 111 when in contact with the deflection plate 119. In a particular embodiment, the deflection plate 119 is configured such that it can be adjusted vertically or horizontally relative to the substrate 111. In a particular embodiment, the deflection plate 119 may be positioned such that it does not contact the flow of the slurry 115 exiting the reservoir 114 through the deposition port 116. In a particular embodiment, the deflection plate 119 may be positioned such that it contacts the flow of the slurry 115 exiting the reservoir 114 through the deposition port 116. In still another embodiment, the deflection plate 119 may be adjusted horizontally relative to the substrate 111 such that the flow of the slurry 115 exiting the reservoir 114 is deflected away from the substrate 111. In still another embodiment, the deflection plate 119 may be in constant motion such that it moves in and out of the flow of the slurry 115 exiting the reservoir 114. Referring again to FIG. 1D and 1E, the deflection plate 119 in FIG. 1D is positioned such that it does not contact the flow of the slurry 115 exiting the reservoir 114 through the deposition port 116. In a particular embodiment, linear or rotary mechanisms may be applied to the deflection plate 119 such that it moves from the position shown in FIG. 1D to the position shown in FIG. 1E such that deflection plate 119 contacts the flow of the slurry 115 exiting the reservoir 114 through the deposition port 116. In still another embodiment, the deflection plate 119 may contact the flow of the slurry 115 such that it is periodically deflected away from the substrate 111.

The embodiments herein may use one or more of the above-noted deposition characteristics to control the amount of slurry 115 that contacts the substrate 111 at a given moment to facilitate controlled contents of the abrasive particles along the length of the substrate 111. For example, the translation speed of the substrate 111 may be altered during the deposition process to facilitate control of the amount of slurry contacting the substrate 111 at a given moment, and as a result, facilitate control of the abrasive particle content along the length of the substrate.

In another embodiment, the flow rate of the slurry 115 from the reservoir 114 may be controlled, and more particularly, varied to control the amount of slurry contacting the substrate 111 at a given time, which facilitates control of the abrasive particle content along the length of the substrate. Various mechanisms to control the slurry flow rate may be utilized, including for example, varying the pumping power used to feed the slurry 115 from the reservoir and through the deposition port 116. As noted above, in certain embodiments, a pump 161 may be a computer controlled device, which can be programmed to vary the force exerted on the slurry 115 in the reservoir, and correspondingly, vary the flow rate of the slurry 115 exiting the reservoir 114 through the deposition port 116. In particular instances, the pump 161 can be programmed to vary the force exerted on the slurry 115 according to a particular mathematical function and the flow rate of the slurry 115 from the reservoir can correspondingly vary according to the mathematical function. Moreover, in certain instances, the content of the abrasive particles along the length of the substrate 111 may vary according to substantially the same mathematical function used to control the pump 161.

In still another embodiment, the deposition port 116 can be controlled to have a varying opening size, which can facilitate control and varying of the slurry flow rate from the reservoir 114, which may also facilitate varying the content of abrasive particles along the length of the substrate. According to one embodiment, the deposition port 116 can be a computer controlled port, wherein the size of the opening defining the deposition port 116 can be controlled and varied by a computer. In one embodiment, the size of the opening defining the deposition port 116 can be varied according to a mathematical function, which can facilitate control of the slurry flow rate from the deposition port 116 according to the mathematical function, and which may also facilitate a varying content of the abrasive particles along the length of the substrate according to substantially the same mathematical function.

In yet another embodiment, the reservoir 114 may use a plurality of deposition ports. The plurality of deposition ports may be distributed around the substrate in any configuration suitable to deposit the slurry 115 on all or a portion of the substrate 111. In one embodiment, the system may alternatively utilize three deposition ports spaced around the circumference of the substrate 111. Each of the three deposition ports may be computer controlled and configured to vary the amount of slurry that is deposited onto the substrate 111 for a given amount of time, which can facilitate varying the content of abrasive particles along the length of the substrate 111.

After depositing the slurry 115 onto the substrate 111 in the deposition region 131, the substrate 111 can be translated to a treatment region 121. The treatment region 121 can include one or more various treatments to the slurry-coated substrate 111 to facilitate formation of an abrasive article. For example, the treatment region 121 can include at least heating, curing, drying, irradiating (e.g., via a laser or other radiation source), evolving, applying one or more gaseous components, solidifying, volatilizing, or any combination thereof. In one particular configuration, the slurry includes a precursor material including a powder, which is treated with heat in the treatment region 121 to change the precursor material into a finally-formed tacking layer or bonding layer. The tacking layer may provisionally hold the abrasive particles to the substrate 111 until a secondary layer, such as a bonding layer can be formed to overlie the abrasive particles and the tacking layer. In an alternative embodiment, the precursor material can be treated to form a bonding material. In such embodiments, the bonding material is directly overlying the substrate 111 (or barrier layer of the substrate) and configured to permanently bond the abrasive particles to the substrate 111.

It will be appreciated that the process of depositing the slurry can facilitate the formation of a tacking layer or bonding layer on the substrate 111. Moreover, one or more secondary layers may be added to the substrate after the deposition of the slurry 115 onto the substrate 111. Such secondary layers may be formed using any one or more processes known to those of skill in the art, including for example, but not limited to, deposition, spraying, dip-coating and the like.

The abrasive particles can include one or more multiple types of abrasive particles, including for example, an oxide, a carbide, a nitride, a boride, an oxynitride, an oxyboride, diamond, or any combination thereof. In certain embodiments, the abrasive particles can include a superabrasive material. For example, one suitable superabrasive material includes diamond. In particular instances, the abrasive particles can consist essentially of diamond.

The abrasive particles can include more than one type of abrasive particle, including for example, a first type of abrasive particle and a second type of abrasive particle. The first and second types of abrasive particles may have at least one abrasive characteristic that is different compared to each other, wherein the abrasive characteristic can include composition, average particle size, hardness, toughness, friability, structure, shape, or a combination thereof. Moreover, in certain instances, wherein the mixture includes more than one type of abrasive particle, the content of the different types of abrasive particles can be different within the mixture, and therefore, different in the finally-formed abrasive article.

In one embodiment, the abrasive particles can include a material having a Vickers hardness of at least about 10 GPa. In other instances, the abrasive particles can have a Vickers hardness of at least about 25 GPa, such as at least about 30 GPa, at least about 40 GPa, at least about 50 GPa, or even at least about 75 GPa. Still, in at least one non-limiting embodiment, the abrasive particles can have a Vickers hardness that is not greater than about 200 GPa, such as not greater than about 150 GPa, or even not greater than about 100 GPa. It will be appreciated that the abrasive particles can have a Vickers hardness within a range between any of the minimum and maximum values noted above.

The abrasive particles can have a particular shape, such as a shape from the group including elongated, equiaxed, ellipsoidal, boxy, rectangular, triangular, irregular, and the like. Moreover, in certain instances, the abrasive particles can have a particular crystalline structure, including but not limited to multicrystalline, monocrystalline, polygonal, cubic, hexagonal, tetrahedral, octagonal, complex carbon structure (e.g., Bucky-ball) or any combination thereof.

Moreover, the abrasive particles may have a particular grit size distribution that may facilitate improved manufacturing and/or performance of the abrasive article. For example, the abrasive particles can be present in the mixture and on the abrasive article in a normal or Gaussian distribution. In still, other instances, the abrasive particles can be present in the mixture in a non-Gaussian distribution, including for example, a multi-modal distribution or a wide grit size distribution. For a wide grit size distribution, at least 80% of the abrasive particles can have an average particle size contained within a range of at least about 30 microns over a range of average particle sizes between about 1 micron to about 100 microns. In one embodiment, the wide grit size distribution can be a bimodal particle size distribution, wherein the bimodal particle size distribution comprises a first mode defining a first median particle size (M1) and a second mode defining a second median particle size (M2) that is different than the first median particle size. According to a particular embodiment, the first median particle size and second median particle size are at least 5% different based on the equation $((M1-M2)/M1) \times 100\%$. In still other embodiments, the first median particle size and the second median particle size can be at least about 10% different, such as at least about 20% different, at least about 30% different, at least about 40% different, at least about 50% different, at least about 60% different, at least about 70% different, at least about 80% different, or even at least about 90% different. Yet, in another non-limiting embodiment, the first median particle size may be not greater than about 99% different, such as not greater than about 90% different, not greater than about 80% different, not greater than about 70% different, not greater than about 60% different, not greater than about 50% different, not greater than about 40% different, not greater than about 30% different, not greater than about 20% different, or even not greater than about 10% different than the second median particle size. It will be appreciated that the difference between the first median particle size and the second median particle size can be within a range between any of the above minimum and maximum percentages.

For a particular embodiment, the abrasive particles can include an agglomerated particle. More particularly, the abrasive particles can consist essentially of agglomerated particles. In certain instances, the mixture may include a combination of agglomerated abrasive particles and unagglomerated abrasive particles. According to an embodiment, an agglomerated particle can include abrasive particles bonded to each other by a binder material. Some suitable examples of a binder material can include an inorganic material, an organic material, or any combination thereof. More particularly, the binder material may be a ceramic, a metal, a glass, a polymer, a resin or any combination thereof. In at least one embodiment, the binder material can be a metal or metal alloy, which may include one or more transition metal elements. According to an embodiment, the binder material can include at least one metal element from a component layer of the abrasive article, including for example, the barrier layer, the tacking layer, the bonding layer, or a combination thereof. In a more particular embodiment, the binder can be a metal material that includes at least one active binding agent. The active binding agent may be an element or composition including a nitride, a carbide, and combination thereof. One particular exemplary active binding agent can include a titanium-containing composition, a chromium-containing composition, a nickel-containing composition, a copper-containing composition, and a combination thereof. In another embodiment, the binder material can include a chemical agent configured to chemically react with a workpiece in contact with the abrasive article to facilitate a chemical removal process on the surface of the workpiece while the abrasive article is also conducting a mechanical removal process. Some suitable chemical agents can include oxides, carbides, nitrides, an oxidizer, pH modifier, surfactant, or any combination thereof.

The agglomerated particle of embodiments herein can include a particular content of abrasive particles, a particular content of binder material, and a particular content of porosity. For example, the agglomerated particle can include a greater content of abrasive particle than a content of binder material. Alternatively, the agglomerated particle can include a greater content of binder material than a content of abrasive particle. For example, in one embodiment, the agglomerated particle can include at least about 5 vol % abrasive particle for the total volume of the agglomerated particle. In other instances, the content of abrasive particles for the total volume of the agglomerated particle can be greater, such as at least about 10 vol %, such as at least about 20 vol %, at least about 30 vol %, at least about 40 vol %, at least about 50 vol %, at least about 60 vol %, at least about 70 vol %, at least about 80 vol %, or even at least about 90 vol %. Yet, in another non-limiting embodiment, the content of abrasive particles in an agglomerated particle for the total volume of the agglomerated particle can be not greater than about 95 vol %, such as not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the abrasive particles in the agglomerated particle can be within a range between any of the above minimum and maximum percentages.

According to another aspect, the agglomerated particle can include at least about 5 vol % binder material for the total volume of the agglomerated particle. In other instances, the content of binder material for the total volume of the agglomerated particle can be greater, such as at least about 10 vol %, such as at least about 20 vol %, at least about 30 vol %, at least about 40 vol %, at least about 50 vol %, at least about 60 vol %, at least about 70 vol %, at least about 80 vol %, or even at least about 90 vol %. Yet, in another non-limiting embodiment, the content of binder material in an agglomerated particle for the total volume of the agglomerated particle can be not greater than about 95 vol %, such as not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the binder material in the agglomerated particle can be within a range between any of the above minimum and maximum percentages.

In yet another aspect, the agglomerated particle can include a particular content of porosity. For example, the agglomerated particle can include at least about 1 vol % porosity for the total volume of the agglomerated particle. In other instances, the content of porosity for the total volume of the agglomerated particle can be greater, such as at least about 5 vol %, at least about 10 vol %, at least about 20 vol %, at least about 30 vol %, at least about 40 vol %, at least about 50 vol %, at least about 60 vol %, at least about 70 vol %, or even at least about 80 vol %. Yet, in another non-limiting embodiment, the content of porosity in an agglomerated particle for the total volume of the agglomerated particle can be not greater than about 90 vol %, not greater than about 80 vol %, not greater than about 70 vol %, not greater than about 60 vol %, not greater than about 50 vol %, not greater than about 40 vol %, not greater than about 30 vol %, not greater than about 20 vol %, or even not greater than about 10 vol %. It will be appreciated that the content of the porosity in the agglomerated particle can be within a range between any of the above minimum and maximum percentages.

The porosity within the agglomerated particle can be of various types. For example, the porosity can be closed porosity, generally defined by discrete pores that are spaced apart from each other within the volume of the agglomerated particle. In at least one embodiment, a majority of the porosity within the agglomerated particle can be closed porosity. Alternatively, the porosity can be open porosity, defining a network of interconnected channels extending through the volume of the agglomerated particle. In certain instances, a majority of the porosity can be open porosity.

The agglomerated particle can be sourced from a supplier. Alternatively, the agglomerated particle may be formed prior to the formation of the abrasive article. Suitable processes for forming the agglomerated particle can include screening, mixing, drying, solidifying, electroless plating, electrolyte plating, sintering, brazing, spraying, printing, or any combination thereof.

According to one particular embodiment, the agglomerated particle can be formed in-situ with the formation of the abrasive article. For example, the agglomerated particle may be formed while forming one or more component layers of the abrasive article. Suitable processes for forming the agglomerated particle in-situ with the abrasive article can include a deposition process. Particular deposition processes can include, but are not limited to, plating, electroplating, dipping, spraying, printing, coating, gravity coating, or any combination thereof. In at least one particular embodiment, the process of forming the agglomerated particle comprises simultaneously forming a bonding layer and the agglomerated particle via a plating process.

According to at least one embodiment, the abrasive particles can have a particle coating layer. Notably, the particle coating layer can overlie the exterior surface of the abrasive particles, and more particularly, may be in direct contact with the exterior surface of the abrasive particles. Suitable materials for use as the particle coating layer can include a metal or metal alloy. In accordance with one particular embodiment, the particle coating layer can include a transition metal element, such as titanium, vanadium, chromium, molybdenum, iron, cobalt, nickel, copper, silver, zinc, manganese, tantalum, tungsten, or any combination thereof. One certain particle coating layer can include nickel, such as a nickel alloy, and even alloys having a majority content of nickel, as measured in weight percent as compared to other species present within the first particle coating layer. In more particular instances, the particle coating layer can include a single metal species. For example, the first particle coating layer can consist essentially of nickel. The particle coating layer can be a plated layer, such that it may be an electrolyte plated layer and an electroless plated layer.

The particle coating layer can be formed to overlie at least a portion of the exterior surface of the abrasive particles. For example, the particle coating layer may overly at least about 50% of the exterior surface area of the abrasive particles. In other embodiments, the coverage of the particle coating layer can be greater, such as at least about 75%, at least about 80%, at least about 90%, at least about 95%, or essentially the entire exterior surface of the abrasive particles.

The particle coating layer may be formed to have a particular content relative to the amount of the first type of abrasive particle to facilitate processing. For example, the particle coating layer can be at least about 5% of the total weight of each of the abrasive particles. In other instances, the relative content of the particle coating layer to the total weight of each of the abrasive particles can be greater, such as at least about 10%, at least about 20%, at least about 30%, at least about 40%, at least about 50%, at least about 60%, at least about 70%, or even at least about 80%. Yet, in another non-limiting embodiment, the relative content of the particle coating layer to the total weight of the abrasive particles may be not greater than about 99%, such as not greater than about 90%, not greater than about 80%, not greater than about 70%, not greater than about 60%, not greater than about 50%, not greater than about 40%, not greater than about 30%, not greater than about 20%, or even not greater than about 10%. It will be appreciated that the relative content of the particle coating layer to the total weight of the abrasive particles can be within a range between any of the minimum and maximum percentages noted above.

According to one embodiment, the particle coating layer can be formed to have a particular thickness suitable to facilitate processing. For example, the particle coating layer can have an average thickness of not greater than about 5 microns, such as not greater than about 4 microns, not greater than about 3 microns, or even not greater than about 2 microns. Still, according to one non-limiting embodiment, the particle coating layer can have an average thickness of at least about 0.01 microns, 0.05 microns, at least about 0.1 microns, or even at least about 0.2 microns. It will be appreciated that the average thickness of the particle coating layer can be within a range between any of the minimum and maximum values noted above.

According to certain aspects herein, the particle coating layer can be formed of a plurality of discrete film layers. For example, the particle coating layer can include a first particle film layer overlying the abrasive particles, and a second particle film layer different than the first particle film layer overlying the first particle film layer. The first particle film layer may be in direct contact with an exterior surface of the abrasive particles and the second particle film layer may be in direct contact with the first particle film layer. The first particle film layer and second particle film layer can be distinct from each other based on at least one material parameter such as average thickness, composition, melting temperature, or a combination thereof.

According to at least one embodiment, the abrasive particles may have a particular size that facilitates improved manufacturing and/or performance of the abrasive article. For example, the abrasive particles can have an average particle size (D50) of not greater than 500 microns, such as not greater than 300 microns, not greater than 200 microns, not greater than 150 microns, not greater than 100 microns, not greater than 80 microns, not greater than 70 microns, not greater than 60 microns, not greater than 50 microns, not greater than 40 microns, not greater than 30 microns or even not greater than 20 microns. Yet, in a non-limiting embodiment, the abrasive particles may have an average particle size (D50) of at least about 0.1 microns, such as at least about 0.5 microns, at least about 1 micron, at least about 2 microns, at least about 5 microns, or even at least about 8 microns. It will be appreciated that the average particle size can be within a range between any of the above minimum and maximum percentages, including for example, at least 1 micron and not greater than 100 microns or at least 2 microns and not greater than 80 microns.

The slurry 115 can include a particular content of abrasive particles, which may facilitate improved manufacturing and/or performance of the abrasive article. For example, the slurry 115 may include at least 5 wt % abrasive particles for a total weight of the mixture. Still, in other instances, the content of the abrasive particles in the slurry 115 can be greater, such as at least 8 wt % or at least 10 wt % or at least 12 wt % or at least 14 wt % or at least 16 wt % or at least 18 wt % or at least 20 wt % or at least 22 wt % or at least 24 wt % or at least 26 wt % or at least 28 wt % or at least 30 wt % or at least 32 wt % or at least 34 wt % or at least 36 wt % or at least 38 wt % or at least 40 wt % or at least 42 wt % or at least 44 wt % or at least 46 wt % or at least 48 wt % or at least 50 wt % for a total weight of the slurry 115. Still, in at least one non-limiting embodiment, the content of abrasive particles in the slurry 115 can be not greater than 80 wt %, such as not greater than 75 wt % or not greater than 70 wt % or not greater than 65 wt % or not greater than 60 wt % or not greater than 55 wt % or not greater than 50 wt % or not greater than 45 wt % or not greater than 40 wt % or not greater than 30 wt % or not greater than 25 wt % or not greater than 20 wt % for a total weight of the slurry 115. It will be appreciated that the slurry 115 can include a content of the abrasive particles within a range including any of the minimum and maximum percentages noted above. Furthermore, the content of the abrasive particles in the slurry 115 can be controlled and modified depending upon the size (e.g., width or diameter) of the substrate, the average particle size of the abrasive particles, and the desired content of abrasive particles present on the substrate in the finally-formed abrasive article.

As described herein, the abrasive article may include a tacking layer, which may be formed from the slurry 115, and more particularly, the precursor material as it is deposited onto the substrate 111. The tacking layer may facilitate adhesion of the abrasive particles from onto the substrate 111 during the deposition process. The tacking layer can be bonded directly to the substrate 111 or a barrier layer on the substrate 111. The tacking layer can be disposed between the substrate 111 and the abrasive particles and bonding layer. The tacking layer may be a conformal and continuous layer. Alternatively, the tacking layer can be a discontinuous layer of material including discrete islands of tacking layer material separated by gap regions where the substrate is exposed without an overlying portion of the tacking layer.

In one particular embodiment, the tacking layer can be formed from the precursor material, such that the powder precursor material is deposited onto the substrate 111 according to the methods disclosed herein. The precursor material can then be treated and the tacking layer can be formed. Thereafter, a bonding layer can be formed over the tacking layer and abrasive particles. The bonding layer may be formed using a deposition process, such as a plating process, and more particularly, an electroplating process.

In accordance with an embodiment, the tacking layer can be formed from a metal, metal alloy, metal matrix composite or any combination thereof. In one particular embodiment, the tacking layer can be formed of a material including a transition metal element. For example, the tacking layer can be a metal alloy including a transition metal element. Some suitable transition metal elements can include, lead, silver, copper, zinc, indium, tin, titanium, molybdenum, chromium, iron, manganese, cobalt, niobium, tantalum, tungsten, palladium, platinum, gold, ruthenium or any combination thereof. According to one particular embodiment, the tacking layer can be made of a metal alloy including tin and lead. In particular, such metal alloys of tin and lead may contain a majority content of tin as compared to lead, including but not limited to, a tin/lead composition of at least about 60/40.

In another embodiment, the tacking layer can be made of a material having a majority content of tin. In fact, in certain abrasive articles, the tacking layer may consist essentially of tin. The tin, alone or in the solder, can have a purity of at least about 99%. The tacking layer may have an organic content of not greater than about 0.5 wt % for a total weight of the plated material (i.e., the tacking layer).

In accordance with an embodiment, the tacking layer can be a solder material. It will be appreciated that a solder material may include a material having a particular melting point, such as not greater than about 450° C. Solder materials are distinct from braze materials, which generally have significantly higher melting points than solder materials, such as greater than 450° C., and more typically, greater than 500° C. Furthermore, brazing materials may have different compositions. In accordance with an embodiment, the tacking layer of the embodiments herein may be formed of a material having a melting point of not greater than about 400° C., such as not greater than about 375° C., not greater than about 350° C., not greater than about 300° C., or even not greater than about 250° C. Still, the tacking layer may have a melting point of at least about 100° C., such as at least about 125° C., at least about 150° C., or even at least about 175° C. It will be appreciated that the tacking layer can have a melting point within a range between any of the minimum and maximum temperatures noted above.

According to one embodiment, the tacking layer can include a same material as the barrier layer, such that the compositions of the barrier layer and the tacking layer share at least one element in common. In yet an alternative embodiment, the barrier layer, and the tacking layer can be entirely different materials.

The tacking layer may be formed to have a particular average thickness compared to the average particle size of the abrasive particles, which may facilitate improved manufacturing and/or use. For example, the tacking layer can have an average thickness of at least about 5% of an average particle size of the abrasive particles. The relative average thickness of the tacking layer to the average particle size of the abrasive particles can be calculated by the absolute value of the equation $(Tb/D50) \times 100\%$, wherein D50 represents the average particle size and Tt represents the average thickness of the tacking layer. In other embodiments, the average thickness of the tacking layer can be greater, such as at least about 8%, at least about 10%, at least about 15%, or even at least about 20%. Still, in another non-limiting embodiment, the average thickness of the tacking layer can be limited, such that it is not greater than about 80% or not greater than 50% or not greater than about 40% or not greater than about 30% or even not greater than about 20% of the average particle size of the abrasive particles. It will be appreciated that the tacking layer can have an average thickness within a range including any of the minimum and maximum percentages noted above.

Figure 2A:
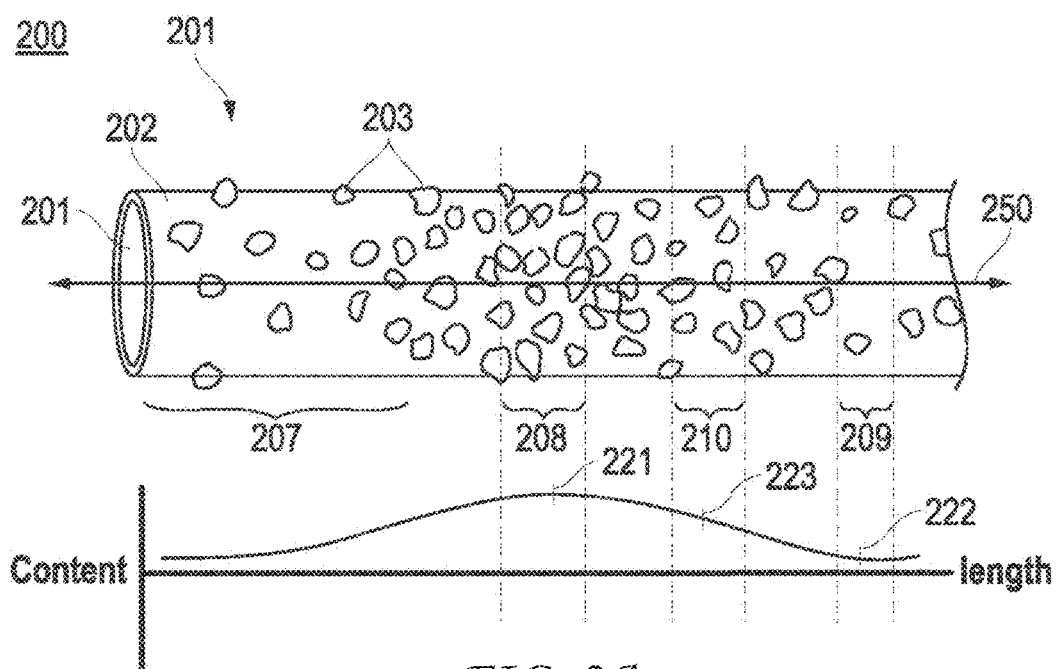
FIG. 2A includes an illustration of a portion of an abrasive article according to an embodiment.

FIG. 2A includes an illustration of a portion of an abrasive article according to an embodiment. As illustrated, the abrasive article 200 includes a substrate 201 defining an elongated body, a bonding layer 202 overlying the substrate 201, and abrasive particles 203 contained in the bonding layer 202 and overlying the substrate 201. The abrasive particles 203 are attached to the substrate 201 via the bonding layer 202. It will be appreciated that one or more coating layers can overlie the bonding layer 202, which are not shown in the illustration. Moreover, it will be appreciated that one or more layers, such as a tacking layer, can be underlying the bonding layer 202.

According to one embodiment, the bonding layer 202 can overlie a majority of an external surface of the substrate 201. In certain embodiments, the bonding layer 202 can be formed such that it overlies at least 90% of the exterior surface of substrate 201 and at least 90% of the finally formed abrasive article. In other embodiments, the coverage of the bonding layer 202 can be greater, such that it overlies at least about 92%, at least about 95%, or even at least about 97% of the substrate 201 and finally-formed abrasive article. In one particular embodiment, the bonding layer 202 can be formed such that it overlies essentially all of the external surfaces of the abrasive article. Still, in an alternative embodiment, the bonding layer can be selectively placed, such that exposed regions can be formed on the abrasive article. Exposed regions can include those regions where the bonding layer 202 is not overlying the substrate 201 and the surface of the substrate 201 or underlying layer (e.g., tacking layer) may be exposed.

The bonding layer 202 can be made of a particular material, such as an organic material, inorganic material or any combination thereof. Some suitable organic materials can include polymers such as a UV curable polymer, thermosets, thermoplastics or any combination thereof. Some other suitable polymer materials can include urethanes, epoxies, polyimides, polyamides, acrylates, polyvinyls, or any combination thereof.

Suitable inorganic materials for use in the bonding layer 202 can include metals, metal alloys, cermets, ceramics, composites or any combination thereof. In one particular instance, the bonding layer can be formed of a material having at least one transition metal element, and more particularly, a metal alloy containing a transition metal element. Some suitable transition metal elements for use in the bonding layer 202 can include nickel, lead, silver, copper, zinc, tin, titanium, molybdenum, chromium, iron, manganese, cobalt, niobium, tantalum, tungsten, palladium, platinum, gold, ruthenium, or any combination thereof. In certain instances, the bonding layer 202 can include nickel, and may be a metal alloy comprising nickel, or even a nickel-based alloy. In still other embodiments, the bonding layer 202 can consist essentially of nickel.

Optionally, the bonding layer 202 can include a filler material. The filler can be various materials suitable for enhancing performance properties of the finally-formed abrasive article. Some suitable filler materials can include wear-resistant particles, pore-formers such as hollow sphere, glass spheres, bubble alumina, natural materials such as shells and/or fibers, metal particles, graphite, lubricious material, and a combination thereof.

In one particular embodiment, the bonding layer 202 can include one or more filler particles, which can be the same as or different from the abrasive particles 203 contained in the slurry and attached to the substrate 201. The filler particles can be significantly different than the abrasive particles 203, particularly with regard to size, such that in certain instances the filler particles can have an average particle size that is substantially less than the average particle size of the abrasive particles 203. For example, the filler particles can have an average particle size that is at least about 2 times less than the average particle size of the abrasive particles 203 or at least 3 times less, such as at least about 5 times less, at least about 10 times less, and particularly within a range between about 2 times and about 10 times less than the average particle size of the abrasive particles 203.

The filler particles within the bonding layer 203 can be made from a material such as carbides, carbon-based materials (e.g. fullerenes), diamond, borides, nitrides, oxides, oxynitrides, oxyborides, or any combination thereof. In particular instances, the filler particles can be a superabrasive material such as diamond, cubic boron nitride, or a combination thereof.

The bonding layer 202 can be in the form of a continuous coating and may have a particular relationship in terms of thickness relative to the average particle size of the abrasive particles 203. For example, the bonding layer 202 can have an average thickness of at least about 5% of an average particle size of the abrasive particles 203. The relative average thickness of the bonding layer 202 to the average particle size of the abrasive particles 203 can be calculated by the absolute value of the equation (Tb/D50)×100%, wherein D50 represents the average particle size of the abrasive particles 203 and Tb represents the average thickness of the bonding layer 202. In other embodiments, the average thickness of the bonding layer 202 can be greater, such as at least about 8%, at least about 10%, at least about 15%, or even at least about 20%. Still, in another non-limiting embodiment, the average thickness of the bonding layer 202 can be limited, such that it is not greater than about 80%, such as not greater 75% or not greater than 70% or not greater than 65% or not greater than 60% or not greater than 50% or not greater than about 40% or not greater than about 30% or even not greater than about 20% of the average particle size of the abrasive particles 203. It will be appreciated that the bonding layer 202 can have an average thickness within a range including any of the minimum and maximum percentages noted above.

In more particular instances, the bonding layer 202 can be formed to have an average thickness that is at least 1 micron. For other abrasive articles, the bonding layer 202 can have a greater average thickness, such as at least about 2 microns, at least about 3 microns, at least about 4 microns, at least about 5 microns, at least about 7 microns, or even at least about 10 microns. Particular abrasive articles can have a bonding layer 202 having an average thickness that is not greater than about 60 microns, such as not greater than about 50 microns, such as not greater than about 40 microns, not greater than about 30 microns, or even not greater than about 20 microns. It will be appreciated that the bonding layer 202 can have an average thickness within a range between any of the minimum and maximum values noted above.

The abrasive article 200 may optionally include a coating layer overlying the bonding layer 202. In at least one instance, the coating layer can be formed such that it is in direct contact with at least a portion of the bonding layer 202. Forming of the coating layer can include a deposition process. Some suitable deposition processes can include plating (electrolyte or electroless), spraying, dipping, printing, coating, or any combination thereof.

The coating layer can include an organic material, an inorganic material, or any combination thereof. According to one aspect, the coating layer can include a material such as a metal, metal alloy, cermet, ceramic, organic, glass or any combination thereof. More particularly, the coating layer can include a transition metal element, including for example, a metal from the group of titanium, vanadium, chromium, molybdenum, iron, cobalt, nickel, copper, silver, zinc, manganese, tantalum, tungsten or any combination thereof. For certain embodiments, the coating layer can include a majority content of nickel, and in fact, may consist essentially of nickel. Alternatively, the coating layer can include a thermoset, a thermoplastic, or any combination thereof. In one instance, the coating layer includes a resin material and may be essentially free of a solvent.

In one particular embodiment, the coating layer can include a filler material, which may be a filler particle that can have any of the same characteristics of the filler particle of the bonding layer 202 described herein.

The abrasive articles of the embodiments herein may have a particular varying content of abrasive particles along the length of the abrasive article. For example, in at least one aspect, the content of the abrasive particles oscillates along the length of the body between a minimum and maximum value, wherein the minimum content is greater than 0. An oscillation can be a varying, but not necessarily predictable, change in the content of the abrasive particles. According to one embodiment, the content of the abrasive particles can oscillate according to a repetitive pattern. In another embodiment, the content of the abrasive particles can oscillate gradually and continuously between the minimum and maximum values. For example, referring again to FIG. 2A, the abrasive article 200 includes a content of abrasive particles 203 that oscillates along at least a portion of the length of the substrate 201. FIG. 2A includes an illustration of a plot of content versus length. As illustrated, the content of the abrasive particles 203 oscillates with a change in position along a length of the substrate 201. More particularly, the content of the abrasive particles increases gradually from region 207 to region 208. Moreover, as illustrated by the plot, the content of the abrasive particles 203 decreases gradually and continuously from region 208 to region 210 to region 209. The content of the abrasive particles 203 in region 208 defines a local maximum 221 and the content of the abrasive particles 203 in the region 209 defines a local minimum 222. Furthermore, as illustrated in FIG. 2A, the content of abrasive particles 203 in region 210 includes a content value 223, which is greater than the content of abrasive particles 203 at the local minimum 222 and the content value 223 is less than the content of abrasive particles 203 at the local maximum 221. It will be appreciated that the change in content of the abrasive particles illustrated in FIG. 2A is only one type of many different possible oscillations.

The content of abrasive particles in a given region is measured according to the Abrasive Particle Count System (APCS), which provides a count of abrasive particles via optical analysis. The abrasive article is translated at a speed of 30 m/min past a Basler PIA2400-17gm camera, which is set in a position to view at least half of the abrasive article. The camera has a resolution of 1 micron and capable of capturing 12 images per second. The camera is set to continuously take pictures, and is coupled to a strobe system configured to switch between illuminated moments and non-illuminated moments. The system utilizes 13 LED lights (12 surrounding one side of the wire and 1 in the camera). The 12 LED lights have a total peak instantaneous power of 1.6 kW. The LED lights are equally spaced around one side of abrasive article and attached to a 12 sided dome surrounding one side (i.e., 180 degrees) of the abrasive article. Prior to capturing useable images, the lighting of the abrasive article is adjusted to properly illuminate the abrasive article and minimize false counts. The brightness of the viewing environment is controlled by software configured to optimize the lighting of the abrasive article to minimize false counts or other errors.

In one second, the camera captures 12 frames, wherein in the illuminated moment the camera captures 2.46 mm of the abrasive article and in the non-illuminated moment 39.54 mm of the abrasive article translates by the camera. Stated alternatively, in every $\frac{1}{12}$ of a second, 2.46 mm of the abrasive article is captured by the camera in an illuminated moment immediately followed by 39.54 mm of the abrasive article translating by the camera in a non-illuminated moment. Every second includes 12 frames and 12 different portions of the abrasive article measuring 2.46 mm that are each separated by 39.54 mm of the abrasive article which are not captured. Every frame includes an image of 2456 pixels or 2.456 mm (i.e., 2456 pixels×0.0001 mm=2.456 mm).

Software analyzes 1 mm in length of each image to determine a count value for the abrasive particles. That is, the abrasive particles in each illuminated moment are counted and the count number is divided by 2.46 to determine the count per 1 mm of length, which is reported herein as a count for a particular illuminated moment. Each $\frac{1}{12}$ of a second has one associated count value. The software is controlled by a threshold value, wherein any area on the wire that could be considered an abrasive particle must have a minimum size based on the D50 of the abrasive particles including any coating on the abrasive particles. The minimum size is $\frac{1}{3}$ of the D50 of the abrasive particles including any coating on the abrasive particles. Any objects having a dimension less than minimum size is not counted as an abrasive particle. It will be understood that the camera cannot capture particles on the opposite side of the abrasive article.

The count for each frame (image of $\frac{1}{12}$ of a second) within a second is averaged to create an average count for a given second in time. The count is the content of abrasive particles on the wire for the length of wire analyzed. Preferably, at least 1000 samples are captured along a suitable length of the abrasive article to provide a suitably representative plot.

As noted herein, FIG. 2A includes an illustration of an abrasive article including an oscillating content of abrasive particles. In particular, the portion of the abrasive article illustrated in FIG. 2A represents an abrasive article having a regular oscillation of abrasive particle content along at least a portion of the length of the abrasive article. A regular oscillation can be characterized by a content of the abrasive particles 203 that varies gradually in a repeatable manner. More particularly, in certain instances, a regular oscillation can be characterized by a content of abrasive particles that varies according to a predictable and undulating function.

Figure 2B:
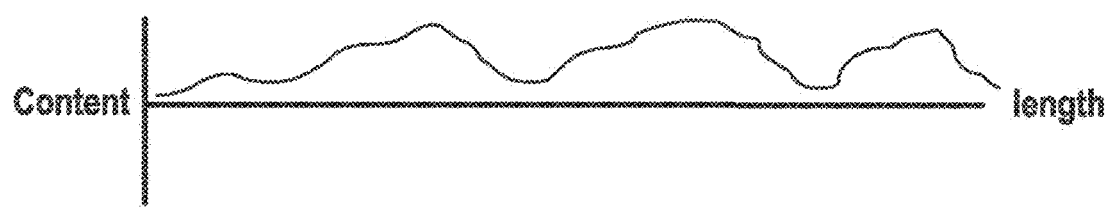
FIG. 2B includes an illustration of a generalized plot of content versus length to demonstrate an oscillating abrasive particle content according to one embodiment.

FIG. 2B includes an illustration of a generalized plot of abrasive particle content versus length for an abrasive article according to another embodiment. As illustrated in FIG. 2B, the content of abrasive particles is oscillating. The content of the abrasive particles 203 varies gradually and continuously along at least a portion of the length of the abrasive article. In the particular embodiment of FIG. 2B, the oscillation is an irregular oscillation defined by a continuous and gradual change in the content of the abrasive particles 203 in an unpredictable or random manner.

Figure 2C:
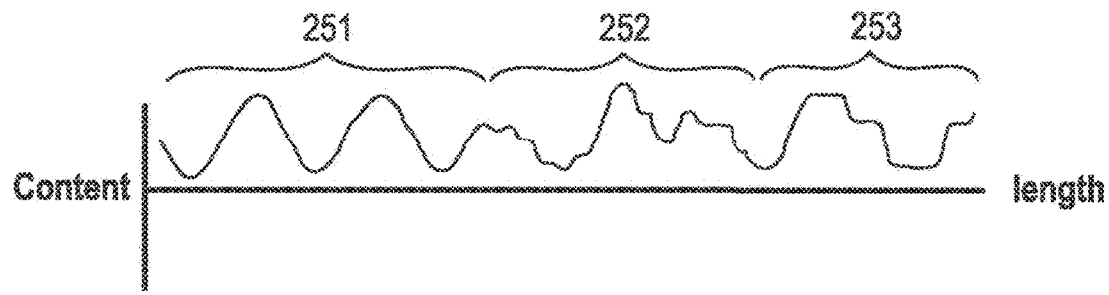
FIG. 2C includes an illustration of a generalized plot of content versus length to demonstrate an oscillating abrasive particle content according to one embodiment.

It will be appreciated that an abrasive article may be formed to have more than one type of oscillation along the length of the abrasive article. The varying types of oscillations can be distinct from each other and separated from each other on different portions or regions along the length of the abrasive article. Varying the type of oscillation along the length of the abrasive article may improve the performance of the abrasive article. FIG. 2C includes a generalized plot of content of abrasive particles versus length for a portion of an abrasive article according to an embodiment. As illustrated, the abrasive article can include three different sections 251, 252 and 253, wherein each of the three different sections 251, 252, and 253 can define three distinct types of oscillations compared to each other. Each of the three different sections 251, 252, and 253, can overlie different places along the length of the abrasive article. As illustrated in FIG. 2C and according to one embodiment, the content of abrasive particles in section 251 includes a regular oscillation in the form of a sinusoidal function. The content of the abrasive particles in section 252 is characterized by an irregular oscillation. The content of the abrasive particles in the section 253 is characterized by a regular oscillation that may be defined by a mathematical function.

Figure 2D:
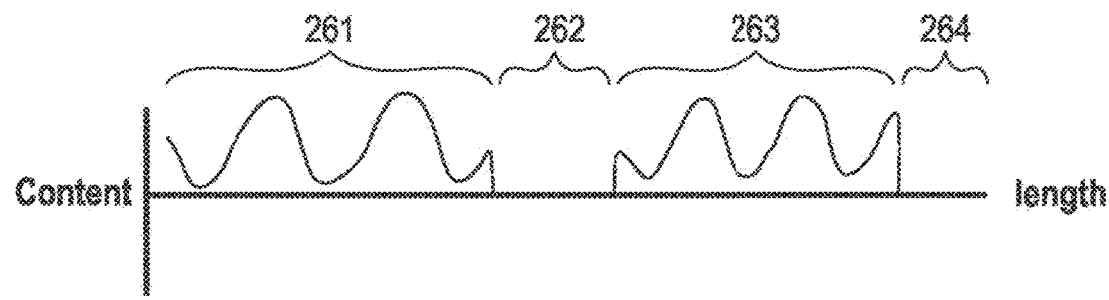
FIG. 2D includes an illustration of a generalized plot of content versus length to demonstrate an oscillating abrasive particle content according to one embodiment.

In still another embodiment, the abrasive article can include one or more sections along portions of the length of the abrasive article that can be separated by one or more uncovered regions. An uncovered region is a region that is free of abrasive particles and has a minimum length of at least ten times the average particle size of the abrasive particles. FIG. 2D includes a generalized plot of the content of abrasive particles versus length for at least a portion of an abrasive article according to an embodiment. As illustrated, the abrasive article includes an abrasive section 261 having a content of abrasive particles characterized by a regular oscillation. The abrasive article further includes an abrasive section 263 having a content of abrasive particles characterized by a regular oscillation, and particularly, the same type of regular oscillation as the content of abrasive particles in section 261. The sections 261 and 263 are separated by an uncovered region 262 having a length that is greater than ten times the average particle size of the abrasive particles. The content of abrasive particles in the uncovered region 262 is zero and represents an interruption in the oscillation between sections 261 and 263. The abrasive article further includes an uncovered region 264 abutting the section 263. The presence of the uncovered regions 262 and 264 may facilitate swarf removal and improvement in the operation of the abrasive article. The length of the sections 261 and 263 relative to the uncovered regions 262 and 264 may be altered depending upon the intended application of the abrasive article. It will be appreciated that sections 261 and 263 may have different oscillations relative to each other. For example, the section 263 may include an irregular oscillation or any other oscillation described in the embodiments herein.

It is understood that the presence of uncovered regions is optional. Embodiments herein may be free of any uncovered regions, such that the entire length of the abrasive article does not include any uncovered regions.

According to one embodiment, the content of the abrasive particles can oscillate for at least 50% of the total length of the substrate or abrasive article. In other embodiments, the content of abrasive particles 203 can oscillate for at least 60% of the total length of the substrate or abrasive article or at least 70% of the total length of the substrate or at least 80% of the total length of the substrate or at least 90% of the total length of the substrate or at least 95% of the total length of the substrate. According to one particular embodiment, the content of abrasive particles can oscillate for the entire length of the substrate or abrasive article. In one non-limiting embodiment, the content of abrasive particles can oscillate for not greater than 99% of the total length of the substrate or abrasive article, such as not greater than 95% or not greater than 90% or not greater than 85% or not greater than 80% or not greater than 70% or not greater than 60% or not greater than 55%. It will be appreciated that the content of the abrasive particles can oscillate for a length within a range including any of the minimum and maximum values noted above.

According to another embodiment, the length of a particular section, which may have a particular type of oscillation, can extend for at least 1% of the total length of the substrate or abrasive article. In other embodiments, the length of section have a particular type of oscillation may be greater, such as at least 3% or at least 5% or at least 10% or at least 15% or at least 20% or at least 30% or at least 40% or at least 50% or at least 60% or at least 70% or at least 80% or at least 90% or at least 95% of the total length of the substrate or abrasive article. According to one particular embodiment, the length of a section can be not greater than 99% of the total length of the substrate or abrasive article, such as not greater than 95% or not greater than 90% or not greater than 85% or not greater than 80% or not greater than 70% or not greater than 60% or not greater than 50% or not greater than 40% or not greater than 30% or not greater than 20% or not greater than 10% or not greater than 5% or not greater than 3%. It will be appreciated that the length of section can be within a range including any of the minimum and maximum values noted above.

It will be appreciated that for an abrasive article including different sections, the length of the sections can be the same or can be different compared to each other. Moreover, for those embodiments including uncovered regions, the length of the uncovered regions can be the same relative to each other. Alternatively, in certain instances, the abrasive article may include multiple uncovered regions, wherein at least two of the uncovered regions have a different length compared to each other.

Figure 3:
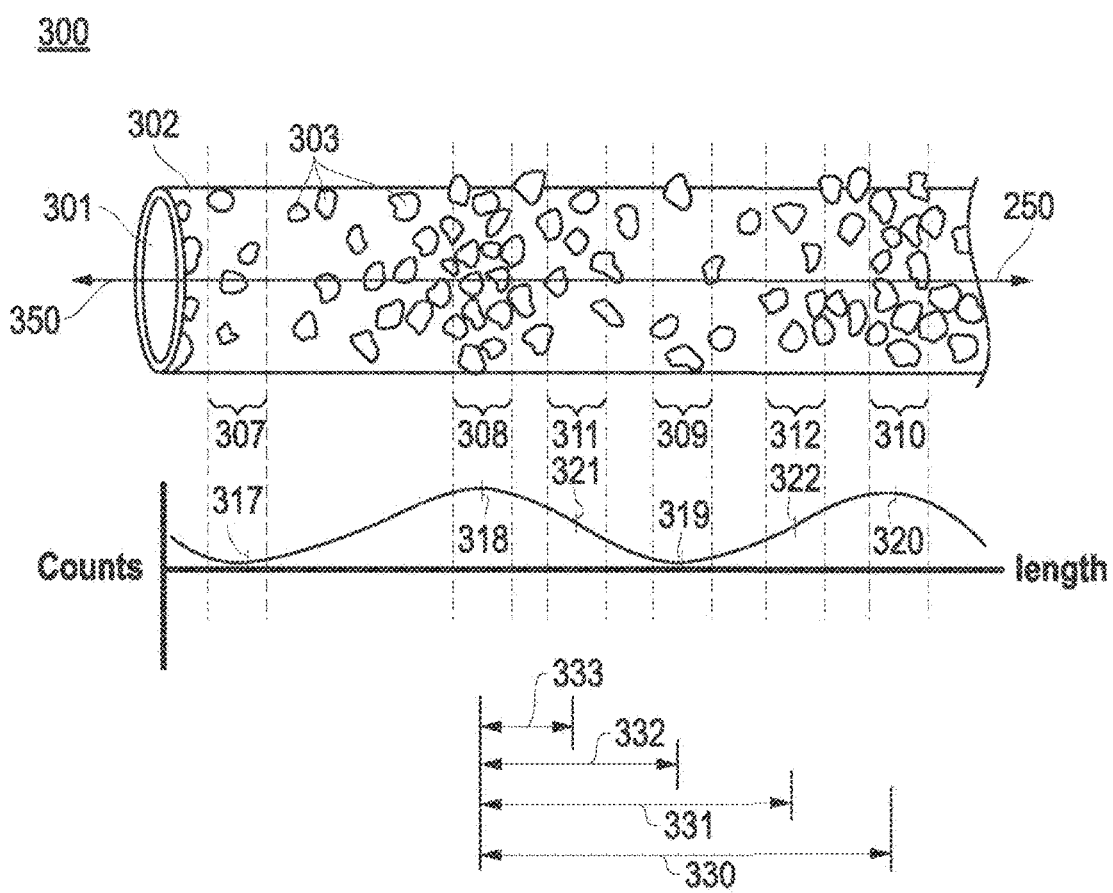
FIG. 3 includes an illustration of a portion of an abrasive article according to an embodiment.

FIG. 3 includes an illustration of a portion of an abrasive article and a corresponding plot of abrasive particle content versus length according to an embodiment. The abrasive article 300 includes a substrate 301, a bonding layer 302 overlying the substrate 301, and abrasive particles 303 contained within the bonding layer 302 and adhered to the substrate 301 via the bonding layer 302. As further illustrated, the content of the abrasive particles varies along at least a portion of the length of the substrate 301 and the abrasive article 300. In particular, and as demonstrated in the generalized plot, the content of abrasive particles varies according to a repetitive pattern, and more particularly, according to a predictable, undulating function between a local minimum and a local maximum. The content of the abrasive particles in the generalized plot of FIG. 3 appears to be defined by a sinusoidal or near-sinusoidal mathematical function. Accordingly, the content of the abrasive particles can include alternating abrasive regions defining a series of alternating local minimums and local maximums extending along the length of the elongated body.

According to the illustrated embodiment, the abrasive article 300 can include a first abrasive region 308 including a local maximum 318, a second abrasive region 309 including a local minimum 319, a third abrasive region 311 including a first local midpoint 321, a fourth abrasive region 310 including a second local maximum 320 that is distinct from and spaced apart from the first local maximum 318, and a fifth abrasive region 312 including a second local midpoint 322 that is distinct from and spaced apart from the first local midpoint 321. As further illustrated, the abrasive article 300 can further include a sixth abrasive region 307 including a second local minimum that is distinct from and separated from the first local minimum 319.

A local maximum is generally understood to be a peak on the plot. More specifically, a local maximum is any point on the plot of content versus length having a slope of zero between an immediately preceding portion of the plot (i.e., to the left of the zero slope point) having a positive slope and an immediately following portion of the plot (i.e., to the right of the zero slope point) having a negative slope. A local minimum is generally understood to be a valley or low point on the plot. More specifically, a local minimum is any point on the plot of content versus length having a slope of zero between an immediately preceding portion of the plot (i.e., to the left of the zero slope point) having a negative slope and an immediately following portion of the plot (i.e., to the right of the zero slope point) having a positive slope. A local midpoint is generally understood to be a point midway between a local maximum and local minimum. A local midpoint may have any slope value. However, in the context of FIG. 3 wherein the content of the abrasive particles is defined by a generally predictable and undulating function, the first local midpoint 321 can have a negative slope as it is positioned between the first local maximum 318 and first local minimum 319. The second local midpoint 322 can have a positive slope as it is positioned between the first local minimum 319 and the second local maximum 320.

According to a particular embodiment, the first abrasive region 308 can include a first content of abrasive particles (C1), wherein C1 can be defined by a content value in the first abrasive region 308 (e.g., the content value (i.e., count value according to the APCS) of the local maximum 318). In a particular embodiment, C1 has a value greater than 0. The second abrasive region 309 can have a second content of abrasive particles (C2), wherein C2 can be defined by a content value in the second abrasive region 309 (e.g., the content value (i.e., count value according to the APCS) of the local minimum 319). In a particular embodiment, C2 has a value greater than 0.

In one particular embodiment, the content values of the abrasive particles in the first and second abrasive regions 308 and 309 can be different and define a content difference (ΔC) of at least 14 counts. The content difference (ΔC) can be the absolute value of the difference of the content value of the second abrasive region 309 subtracted from the content value C1 of the first abrasive region 308, such that ΔC=|C1−C2|. In a particular embodiment, the abrasive article 300 can be formed to have a particular content difference (ΔC), which may facilitate improved performance of the abrasive article. In another embodiment, the content difference (ΔC) can be at least 8 counts or at least 10 counts or at least 14 counts or at least 15 counts or at least 20 counts or at least 25 counts or at least 30 counts or at least 35 counts or at least 40 counts or at least 45 counts or at least 50 counts. Still, in one non-limiting embodiment, the content difference (ΔC) can be not greater than 200 counts or not greater than 150 counts or not greater than 100 counts or not greater than 90 counts or not greater than 80 counts or not greater than 70 counts or not greater than 65 counts or not greater than 60 counts. It will be appreciated that the content difference can be within a range including any of the minimum and maximum values noted above.

It will also be appreciated that the content difference is applicable to any oscillations, and not just those variation in the content of abrasive particles characterized by a predictable, undulating function as illustrated in FIG. 3. Any oscillation having a local maximum and local minimum may have a content difference (i.e., $\Delta C=|C1-C2|$) as described herein.

According to one embodiment, C1 can have a value of at least 30 counts according to the APCS. In another embodiment, the value of C1 can be greater, such as at least 32 counts or at least 35 counts or at least 37 counts or at least 40 counts or at least 43 counts or at least 45 counts or at least 47 counts or at least 50 counts or at least 53 counts or at least 55 counts. In another non-limiting embodiment, C1 can have a value of not greater than 100 counts or not greater than 90 counts or not greater than 80 counts or not greater than 70 counts or not greater than 67 counts or not greater than 65 counts or not greater than 63 counts or not greater than 60 counts or not greater than 57 counts. It will be appreciated that C1 can have a value within a range including any of the minimum or maximum values noted above, including for example, within a range including at least 30 counts and not greater than 100 counts or within a range including at least 40 counts and not greater than 70 counts or even within a range including at least 45 counts and not greater than 70 counts.

According to another embodiment, C2 can have a value of at least 5 counts according to the APCS. In another embodiment, the value of C2 can be greater, such as at least 6 counts or at least 7 counts or at least 8 counts or at least 9 counts or at least 10 counts or at least 11 counts or at least 12 counts or at least 13 counts or at least 14 counts or at least 15 counts or at least 16 counts or at least 17 counts or at least 18 counts or at least 19 counts or at least 20 counts. In another non-limiting embodiment, C2 can have a value of not greater than 50 counts or not greater than 40 counts or not greater than 40 counts or not greater than 35 counts or not greater than 30 counts or not greater than 28 counts or not greater than 25 counts or not greater than 22 counts or not greater than 20 counts. It will be appreciated that C2 can have a value within a range including any of the minimum or maximum values noted above, including for example, within a range including at least 5 counts and not greater than 50 counts or within a range including at least 5 counts and not greater than 30 counts or even within a range including at least 5 counts and not greater than 25 counts.

As noted above, the abrasive article 300 can include a third abrasive region 311 including a first local midpoint 321. The third abrasive region 311 can include a third content of abrasive particles (C3), wherein C3 can be defined by a content value at the first local midpoint 321, wherein the first local midpoint is positioned at the midpoint between the first local maximum 318 and the first local minimum 319 as measured along the longitudinal axis 350 of the substrate 301. In a particular embodiment, C3 can have a value between C1 of the first local maximum 318 and C2 of the first local minimum 319 such that C1>C3>C2.

In one particular embodiment, C3 can have a value of at least 11 counts according to the APCS. In another embodiment, the value of C3 can be greater, such as at least 12 counts or at least 15 counts or at least 18 counts or at least 20 counts or at least 25 counts or at least 30 counts or at least 35 counts or at least 40 counts or at least 45 counts or at least 50 counts. In another non-limiting embodiment, C3 can have a value of not greater than 80 counts or not greater than 70 counts or not greater than 60 counts or not greater than 50 counts or not greater than 45 counts or not greater than 40 counts or not greater than 35 counts. It will be appreciated that C3 can have a value within a range including any of the minimum or maximum values noted above, including for example, within a range including at least 12 counts and not greater than 80 counts or within a range including at least 20 counts and not greater than 50 counts or even within a range including at least 25 counts and not greater than 45 counts.

As noted herein, the abrasive article 300 can include a fourth abrasive region 310 including a second local maximum 320. The fourth abrasive region 310 can include a fourth content of abrasive particles (C4), wherein C4 can be defined by a content value at the second local maximum 320. In a particular embodiment, C4 can have any of the attributes of C1 as described in embodiments herein.

The abrasive article 300 can include a fifth abrasive region including a fifth local midpoint 322. The fifth abrasive region 311 can include a fifth content of abrasive particles (C5), wherein C5 can be defined by a content value at the second local midpoint 322, wherein the second local midpoint is positioned at the midpoint between the second local maximum 320 and the first local minimum 319 as measured along the longitudinal axis 350 of the substrate 301. In a particular embodiment, C5 can have a value between C4 of the second local maximum 320 and C2 of the first local minimum 319 such that C4>C5>C2. C5 can have any of the attributes of C3 as described in embodiments herein.

According to another embodiment, the varying content of the abrasive particles can define a cycle, which can include the distance between two immediately adjacent local maximums. For example, the embodiment of FIG. 3 defines a cycle between the first local maximum 318 and the second local maximum 320. According to one embodiment, the abrasive article can include at least 1 cycle extending along the entire length of the elongated body of the substrate 301. In still other embodiments, the abrasive article 300 can include at least 10 cycles, such as at least 100 cycles or at least $1\times10^3$ cycles or at least $1\times10^4$ cycles or at least $1\times10^5$ cycles or at least $5\times10^5$ cycles or at least $7.5\times10^5$ cycles or at least $1\times10^6$ cycles or at least $1.3\times10^6$ cycles or at least $1.5\times10^6$ cycles or at least $2\times10^6$ cycles. Still, in one non-limiting embodiment, the abrasive article can include not greater than $1\times10^{10}$ cycles extending along the entire length of the elongated body of the substrate 301, such as not greater than $1\times10^9$ or not greater than $1\times10^8$ or not greater than $1\times10^7$. It will be appreciated that the number of cycles extending along the entire length of the elongated body of the substrate 301 can be within a range including any of the minimum and maximum values noted above. It will also be appreciated that such a relationship of the cycle to the length of the elongated body can be applicable to other embodiments herein besides the embodiment illustrated in FIG. 3.

According to another embodiment, the cycle can have a length 330 as defined as the distance along the longitudinal axis 350 of the substrate 301. For at least one embodiment, the length 330 can be not greater than 90% of the entire length of the elongated body of the substrate 301, such as not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5% or not greater than 3% or not greater than 1% of the total length of the elongated body of the substrate 301. Still, in one non-limiting embodiment, the length 330 can be at least 0.0001% of the total length of the elongated body, such as at least 0.001% or at least 0.01% or at least 0.1% or at least 1% or at least 2% or at least 3% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% of the total length of the elongated body. It will be appreciated that the length 330 can be within a range including any of the minimum and maximum values noted above. It will also be appreciated that the length 330 can be applicable to other embodiments herein besides the embodiment illustrated in FIG. 3.

According to one embodiment, C1 can correspond to the first local maximum 318 and C2 can correspond to the first local minimum 319, and the distance between first local maximum 318 and the first local minimum 319 can define a local peak-to-peak length 332 of not greater than 95% of the total length of the elongated body of the substrate 301. Still, in another embodiment, the length 332 can be not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5% or not greater than 3% or not greater than 1% or not greater than 0.5% or not greater than 0.1% or not greater than 0.01% or not greater than 0.001% of the total length of the elongated body. Still, in another non-limiting embodiment, the length 332 can be at least 0.00001% of the total length of the elongated body of the substrate 301, such as or at least 0.0001% or at least 0.001% or at least 0.01% or at least 0.1% or at least 1% or at least 2% or at least 3% or at least 5% or at least 10% or at least 15% or at least 20% or at least 25% or at least 30% or at least 35% or at least 40% or at least 45% of the total length of the elongated body. It will be appreciated that the length 332 can be within a range including any of the minimum and maximum values noted above. It will also be appreciated that the length 332 can be applicable to other embodiments herein besides the embodiment illustrated in FIG. 3.

In another embodiment the abrasive article can have a length 331 corresponding to a distance between a first local maximum 318 and a second local midpoint 322, wherein there is at least one local maximum or local minimum (i.e., first local minimum 319) disposed between the first local maximum 318 and a second local midpoint 322. In at least one embodiment, the length 331 can be not greater than 95% of the total length of the elongated body of the substrate 301. Still, in another embodiment, the length 331 can be not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5% or not greater than 3% or not greater than 1% or not greater than 0.5% or not greater than 0.1% or not greater than 0.01% or not greater than 0.001% of the total length of the elongated body of the substrate 301. Still, in another non-limiting embodiment, the length 331 can be at least 0.00001% of the total length of the elongated body of the substrate 301, such as or at least 0.0001% or at least 0.001% or at least 0.01% or at least 0.1% or at least 1% or at least 2% or at least 3% or at least 5% or at least 10% or at least 15% or at least 20% or at least 25% or at least 30% or at least 35% or at least 40% or at least 45% of the total length of the elongated body. It will be appreciated that the length 331 can be within a range including any of the minimum and maximum values noted above. It will also be appreciated that the length 331 can be applicable to other embodiments herein besides the embodiment illustrated in FIG. 3.

In another embodiment the abrasive article can have a length 333 corresponding to a distance between a first local maximum 318 and an immediately adjacent first local midpoint 321, wherein there are no local maxima or local minima (i.e., first local minimum 319) disposed between the first local maximum 318 and the first local midpoint 321. In at least one embodiment, the length 333 can be not greater than 95% of the total length of the elongated body of the substrate 301. Still, in another embodiment, the length 333 can be not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5% or not greater than 3% or not greater than 1% or not greater than 0.5% or not greater than 0.1% or not greater than 0.01% or not greater than 0.001% of the total length of the elongated body of the substrate 301. Still, in another non-limiting embodiment, the length 333 can be at least 0.00001% of the total length of the elongated body of the substrate 301, such as or at least 0.0001% or at least 0.001% or at least 0.01% or at least 0.1% or at least 1% or at least 2% or at least 3% or at least 5% or at least 10% or at least 15% or at least 20% or at least 25% or at least 30% or at least 35% or at least 40% or at least 45% of the total length of the elongated body. It will be appreciated that the length 333 can be within a range including any of the minimum and maximum values noted above. It will also be appreciated that the length 333 can be applicable to other embodiments herein besides the embodiment illustrated in FIG. 3.

In another aspect, a majority of the length of the substrate 301 may be coated with the abrasive particles. For example, according to one embodiment, the abrasive particles can be overlying at least 50% of the entire length of the elongated body of the substrate 301, such as at least 60% or at least 70% or at least 80% or at least 90% or at least 95% of the entire length of the elongated body of the substrate 301. In one particular embodiment, the abrasive particles can overly the entire length of the elongated body of the substrate 301. Still, in one non-limiting embodiment, the abrasive particles can be overlying not greater than 99% of the entire length of the elongated body of the substrate 301, such as not greater than 95% or not greater than 90% or not greater than 80% or not greater than 70% or not greater than 60%. It will be appreciated that the percent coverage of the abrasive particles along the length of the substrate can be within a range including any of the minimum and maximum percentages noted above. For the purpose of defining the percent coverage of the abrasive particles on the length of the substrate, one may identify uncovered regions that have a minimum size of at least ten times the average particle size of the abrasive particles (including any coating materials). An uncovered region may be used to identify an area of the abrasive article that is not covered by abrasive particles.

According to another embodiment, the abrasive particles may have a random orientation relative to each other. The placement of the abrasive particles may not have any long range order, as may be the case for abrasive particles that are placed on the substrate in a predetermined distribution (e.g., a pattern). Moreover, the placement of the abrasive particles may not have a discernable short range order, such that the placement of an immediately adjacent abrasive particle is not predictable based on the placement of a given abrasive particle.

However, in an alternative embodiment, the abrasive particles may be placed on the substrate such that the abrasive particles define a predetermined distribution. A predetermined distribution can have a predictable order, such that the position of one or more abrasive particles can be predicted by knowing the position of a given abrasive particle.

In another aspect, the abrasive article 300 can be formed to have a particular average concentration of abrasive particles, which may facilitate improved performance of the abrasive article. Reference herein to an average concentration is understood to be derived from an average count value based on measurements taken for a second of time. According to one embodiment, the abrasive article can have an average abrasive particle concentration of at least 5 particles per mm of substrate, such as at least 10 particles per mm of substrate or at least 20 particles per mm of substrate or at least 30 particles per mm of substrate or even at least 40 particles per mm of substrate. In still another non-limiting embodiment, the average abrasive particle concentration can be not greater than 800 particles per mm, such as not greater than 700 particles per mm or not greater than 600 particles per mm or not greater than 500 particles per mm or not greater than 400 particles per mm or not greater than 300 particles per mm or not greater than 200 particles per mm. It will be appreciated that the average abrasive particle concentration can be within a range including any of the minimum and maximum values noted above.

In still another embodiment, the abrasive article can be formed to have a particular average concentration of abrasive particles, which may facilitate improved performance of the abrasive article. According to one embodiment, the abrasive article can have an average abrasive particle concentration of at least 0.5 carats per kilometer of the abrasive article, such as at least 1.0 carats per kilometer, at least about 1.5 carats per kilometer of the abrasive article, at least 5 carats per kilometer, at least about 10 carats per kilometer of the abrasive article, at least 15 carats per kilometer or even at least about 20 carats per kilometer of the abrasive article. In still another non-limiting embodiment, the average abrasive particle concentration can be not greater than 30 carats per kilometer, such as not greater than 25 carats per kilometer or not greater than 20 carats per kilometer or not greater than 18 carats per kilometer or not greater than 16 carats per kilometer or even not greater than 14 carats per kilometer or not greater than 12 carats per kilometer or not greater than 10 carats per kilometer or not greater than 8 carats per kilometer or even not greater than 6 carats per kilometer. It will be appreciated that the average abrasive particle concentration can be within a range including any of the minimum and maximum values noted above.

Generally, cutting, slicing, bricking, squaring, or any other operation can be conducted by moving the abrasive article and the workpiece relative to each other. Various types and orientations of the abrasive articles relative to the workpieces may be utilized, such that a workpiece is sectioned into wafers, bricks, rectangular bars, prismatic sections, and the like.

This may be accomplished using a reel-to-reel machine, wherein moving comprises reciprocating the wire saw between a first position and a second position. In certain instances, moving the abrasive article between a first position and a second position comprises moving the abrasive article back and forth along a linear pathway. While the wire is being reciprocated, the workpiece may also be moved, including for example, rotating the workpiece.

Alternatively, an oscillating machine may be utilized with any abrasive article according to the embodiments herein. Use of an oscillating machine can include moving the abrasive article relative to the workpiece between a first position and second position. The workpiece may be moved, such as rotated, and moreover the workpiece and wire can both be moved at the same time relative each other. An oscillating machine may utilize a back and forth motion of the wire guide relative to the workpiece, wherein a reel-to-reel machine does not necessarily utilize such a motion.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

An abrasive article comprising a substrate comprising an elongated body; and abrasive particles attached to the elongated body, wherein the content of the abrasive particles oscillates along the length of the body between a minimum and maximum value, wherein the minimum content is greater than 0.

Embodiment 2

An abrasive article comprising a substrate comprising an elongated body; and abrasive particles attached to the elongated body, wherein at least a portion of the abrasive particles have a varying content according to a predictable, undulating function between a local minimum and local maximum value.

Embodiment 3

An abrasive article comprising a substrate comprising an elongated body; a first abrasive region comprising abrasive particles overlying the elongated body, wherein the first abrasive region comprises a first content of abrasive particles (C1), wherein C1>0; a second abrasive region comprising abrasive particles overlying the elongated body, wherein the second abrasive region comprises a second content of abrasive particles (C2), wherein C2>0; and a content difference (ΔC) between the first content and the second content of at least 14 counts.

Embodiment 4

An abrasive article comprising a substrate comprising an elongated body; and abrasive particles attached to the elongated body, wherein the abrasive particles define a varying content between a local minimum content and a local maximum content, and wherein the local minimum content is at least 5 counts and a content difference (ΔC) between the local minimum content and the local maximum content is at least 14 counts.

Embodiment 5

The abrasive article of any one of Embodiments 2, 3, and 4, wherein the content of the abrasive particles oscillates along the length of the body between a minimum and maximum value, wherein the minimum content is greater than 0.

Embodiment 6

The abrasive article of any one of Embodiments 1 and 5, wherein the content of the abrasive particles oscillates according to a repetitive pattern.

Embodiment 7

The abrasive article of any one of Embodiments 1 and 5, wherein the content of the abrasive particles oscillates gradually and continuously between the minimum and maximum values.

Embodiment 8

The abrasive article of any one of Embodiments 1 and 5, wherein the content of the abrasive particles oscillates for at least 50% of the total length of the substrate or at least 60% of the total length of the substrate or at least 70% of the total length of the substrate or at least 80% of the total length of the substrate or at least 90% of the total length of the substrate or at least 95% of the total length of the substrate.

Embodiment 9

The abrasive article of any one of Embodiments 1, 3, and 4, wherein at least a portion of the abrasive particles have a varying content according to a predictable, undulating function between a local minimum and local maximum value.

Embodiment 10

The abrasive article of any one of Embodiments 2 and 8, wherein the content of the abrasive particles oscillates according to a repetitive pattern.

Embodiment 11

The abrasive article of any one of Embodiments 2 and 8, wherein the content of the abrasive particles oscillates gradually and continuously between the minimum and maximum values.

Embodiment 12

The abrasive article of any one of Embodiments 2 and 8, wherein the content of the abrasive particles oscillates for at least 50% of the total length of the substrate or at least 60% of the total length of the substrate or at least 70% of the total length of the substrate or at least 80% of the total length of the substrate or at least 90% of the total length of the substrate or at least 95% of the total length of the substrate.

Embodiment 13

The abrasive article of any one of Embodiments 2 and 8, wherein the body includes at least a first abrasive region having a first content of abrasive particles (C1) and defining a first local maximum, a second abrasive region having a second content of abrasive particles (C2) and defining a first local minimum, and a third abrasive region having a third content of abrasive particles (C3), wherein C1>C3>C2.

Embodiment 14

The abrasive article of Embodiment 13, further comprising a fourth abrasive region comprising a fourth content of abrasive particles (C4) and defining a second local maximum spaced apart from the first local maximum, and wherein C4>C3>C2.

Embodiment 15

The abrasive article of Embodiment 14, further comprising a fifth abrasive region comprising a fifth content of abrasive particles (C5) and disposed between the second abrasive region and the fourth abrasive region, wherein C4>C5>C2.

Embodiment 16

The abrasive article of Embodiment 14, wherein the length along the elongated body between the first abrasive region and the fourth abrasive region defines a cycle.

Embodiment 17

The abrasive article of Embodiment 16, further comprising at least 1 cycle extending along the length of the elongated body or at least 10 cycles or at least 100 cycles or at least 1×103 cycles or at least 1×104 cycles or at least 1×105 cycles or at least 5×105 cycles or at least 7.5×105 cycles or at least 1×106 cycles or at least 1.3×106 cycles or at least 1.5×106 cycles or at least 2×106 cycles.

Embodiment 18

The abrasive article of Embodiment 17, further comprising not greater than 1×1010 cycles extending along the length of the elongated body or not greater than 1×109 or not greater than 1×108 or not greater than 1×107.

Embodiment 19

The abrasive article of Embodiment 16, wherein the cycle has a length that extends for the entire length of the elongated body.

Embodiment 20

The abrasive article of Embodiment 16, wherein the cycle has a length that is not greater than 95% of the entire length of the elongated body or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5% or not greater than 3% or not greater than 1% of the total length of the elongated body.

Embodiment 21

The abrasive article of Embodiment 16, wherein the cycle has a length that is at least 0.0001% of the total length of the elongated body or at least 0.001% or at least 0.01% or at least 0.1% or at least 1% or at least 2% or at least 3% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% of the total length of the elongated body.

Embodiment 22

The abrasive article of any one of Embodiments 1, 2 and 4, further comprising a first abrasive region comprising abrasive particles overlying the elongated body, wherein the first abrasive region comprises a first content of abrasive particles (C1), wherein C1>0; a second abrasive region comprising abrasive particles overlying the elongated body, wherein the second abrasive region comprises a second content of abrasive particles (C2), wherein C2>0; and a content difference (ΔC) between the first content and the second content of at least 14 counts.

Embodiment 23

The abrasive article of any one of Embodiments 3 and 22, wherein the content difference (ΔC) is at least 8 counts at least 10 counts or at least 15 counts or at least 20 counts or at least 25 counts or at least 30 counts or at least 35 counts or at least 40 counts or at least 45 counts or at least 50 counts.

Embodiment 24

The abrasive article of any one of Embodiments 3 and 22, wherein the content difference (ΔC) is not greater than 200 counts or not greater than 150 counts or not greater than 100 counts or not greater than 90 counts or not greater than 80 counts or not greater than 70 counts or not greater than 65 counts or not greater than 60 counts.

Embodiment 25

The abrasive article of any one of Embodiments 3 and 22, wherein C1 corresponds to a local maximum content.

Embodiment 26

The abrasive article of Embodiment 22, wherein C2 corresponds to a local minimum content.

Embodiment 27

The abrasive article of Embodiment 22, further comprising a third abrasive region between the first and second abrasive regions, wherein the third abrasive region comprises a third content of abrasive particles (C3), wherein C1>C3>C2.

Embodiment 28

The abrasive article of any one of Embodiments 3 and 22, further comprising alternating abrasive regions defining a series of alternating local minimum and local maximum abrasive contents extending along the length of the elongated body.

Embodiment 29

The abrasive article of any one of Embodiments 3 and 22, wherein C1 corresponds to a local maximum content and C2 corresponds to a local minimum content, and wherein the first and second regions are adjacent local values and defining a local peak-to-peak length, wherein the local peak-to-peak length is not greater than 95% of the total length of the elongated body or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10% or not greater than 5% or not greater than 3% or not greater than 1% of the total length of the elongated body.

Embodiment 30

The abrasive article of Embodiment 29, wherein the local peak-to-peak length has a length of at least 0.00001% of the total length of the elongated body or at least 0.0001% or at least 0.001% or at least 0.01% or at least 0.1% or at least 1% or at least 2% or at least 3% or at least 5% or at least 10% or at least 15% or at least 20% or at least 25% or at least 30% or at least 35% or at least 40% or at least 45% of the total length of the elongated body.

Embodiment 31

The abrasive article of any one of Embodiments 1, 2, and 3, wherein the abrasive particles define a varying content between a local minimum content and a local maximum content, and wherein the local minimum content is at least 5 counts and a content difference (ΔC) between the local minimum content and the local maximum content is at least 14 counts.

Embodiment 32

The abrasive article of any one of Embodiments 4 and 25, further comprising alternating abrasive regions defining a series of alternating local minimum and local maximum abrasive contents extending along the length of the elongated body.

Embodiment 33

The abrasive article of any one of Embodiments 1, 2, 3, and 4, wherein the abrasive particles are overlying at least 50% of the length of the elongated body, or at least 60% or at least 70% or at least 80% or at least 90% or at least 95%.

Embodiment 34

The abrasive article of any one of Embodiments 1, 2, 3, and 4, wherein the abrasive particles overly the elongated body and the elongated body are free of an uncovered region.

Embodiment 35

The abrasive article of any one of Embodiments 1, 2, 3, and 4, wherein the abrasive particles are arranged in a random arrangement relative to each other.

Embodiment 36

The abrasive article of any one of Embodiments 1, 2, 3, and 4, wherein the substrate comprises a material selected from the group consisting of metal, metal alloys, ceramic, glass, and a combination thereof, wherein the substrate comprises a metal comprising a transition metal element, wherein the substrate comprises steel, wherein the substrate has an elongated body, the substrate comprises an elongated body having an aspect ratio of length:width of at least about 10:1, wherein the substrate comprises an elongated body having an aspect ratio of length:width of at least about 10,000:1.

Embodiment 37

The abrasive article of any one of Embodiments 1, 2, 3, and 4, wherein the substrate comprises an average length of at least about 50 m, at least about 100 m, at least about 500 m, at least about 1000 m.

Embodiment 38

The abrasive article of any one of Embodiments 1, 2, 3, and 4, wherein the substrate comprises an average width of not greater than about 1 mm, not greater than about 0.8 mm, not greater than about 0.5 mm.

Embodiment 39

The abrasive article of any one of Embodiments 1, 2, 3, and 4, wherein the substrate consists essentially of a wire.

Embodiment 40

The abrasive article of any one of Embodiments 1, 2, 3, and 4, wherein the core of the substrate comprises a plurality of filaments braided together.

Embodiment 41

The abrasive article of any one of Embodiments 1, 2, 3, and 4, wherein the substrate comprises high strength steel wire, wherein the substrate comprises a break strength of at least about 3 GPa.

Embodiment 42

The abrasive article of any one of Embodiments 1, 2, 3, and 4, further comprising a barrier layer in direct contact with a peripheral surface of the substrate.

Embodiment 43

The abrasive article of Embodiment 42, wherein the barrier layer comprises an average thickness of not greater than about 10 microns.

Embodiment 44

The abrasive article of Embodiment 42, wherein the barrier layer is a dip-coating layer, wherein the barrier layer is applied at a temperature not greater than about 400° C.

Embodiment 45

The abrasive article of any one of Embodiments 1, 2, 3, and 4, further comprising a tacking layer overlying the elongated body of the substrate.

Embodiment 46

The abrasive article of Embodiment 45, wherein the tacking layer comprises a material selected from the group of materials consisting of metal, metal alloys, metal matrix composites, or any combination thereof.

Embodiment 47

The abrasive article of Embodiment 45, wherein the tacking layer comprises a solder material.

Embodiment 48

The abrasive article of Embodiment 45, wherein the tacking layer comprises an average thickness of not greater than about 80% of an average particle size of the abrasive particles.

Embodiment 49

The abrasive article of any one of Embodiments 1, 2, 3, and 4, wherein the abrasive particles comprises a material selected from the group of materials consisting of oxides, carbides, nitrides, borides, oxynitrides, oxyborides, diamond, or any combination thereof.

Embodiment 50

The abrasive article of any one of Embodiments 1, 2, 3, and 4, wherein the abrasive particles consist essentially of diamond.

Embodiment 51

The abrasive article of any one of Embodiments 1, 2, 3, and 4, wherein the abrasive particles include a first type of abrasive particle and a second type of abrasive particle, and wherein the first type of abrasive particle and second type of abrasive particle are different from each other based on at least one particle characteristics selected from the group consisting of hardness, friability, toughness, particle shape, crystalline structure, average particle size, composition, particle coating, grit size distribution, or any combination thereof.

Embodiment 52

The abrasive article of any one of Embodiments 1, 2, 3, and 4, wherein the abrasive particles comprise an average particle size of not greater than about 500 microns or not greater than about 300 microns or not greater than about 200 microns or not greater than about 150 microns or not greater than about 100 microns.

Embodiment 53

The abrasive article of any one of Embodiments 1, 2, 3, and 4, wherein the abrasive particles comprise an average particle size of at least about 0.1 microns or at least about 0.5 microns or at least about 1 micron or at least about 2 microns or at least about 5 microns or at least about 8 microns.

Embodiment 54

The abrasive article of any one of Embodiments 1, 2, 3, and 4, wherein the abrasive particles comprise a coating including a material selected from the group consisting of metals, metal alloys or any combination thereof, wherein the coating comprises a metal selected from the group of metals consisting of titanium, vanadium, chromium, molybdenum, iron, cobalt, nickel, copper, silver, zinc, manganese, tantalum, tungsten or any combination thereof.

Embodiment 55

The abrasive article of any one of Embodiments 1, 2, 3, and 4, further comprising a bonding layer configured to hold the abrasive particles to the substrate, wherein the bonding layer comprises a material selected from the group of materials consisting of metals, metal alloys, cermets, ceramics, composites, and a combination thereof.

Embodiment 56

The abrasive article of Embodiment 55, wherein the bonding layer comprises a transition metal element.

Embodiment 57

The abrasive article of Embodiment 55, wherein the bonding layer comprises an alloy of transition metal elements.

Embodiment 58

The abrasive article of Embodiment 55, wherein the bonding layer comprises a metal selected from the group of metals consisting of nickel, lead, silver, copper, zinc, tin, titanium, molybdenum, chromium, iron, manganese, cobalt, niobium, tantalum, tungsten, palladium, platinum, gold, ruthenium.

Embodiment 59

The abrasive article of Embodiment 55, wherein the bonding layer comprises an average thickness of at least about 5% of an average particle size (D50) of the abrasive particles or at least about 10% or at least about 15% or at least about 20%.

Embodiment 60

The abrasive article of Embodiment 55, wherein the bonding layer comprises an average thickness of not greater than 80% of an average particle size (D50) of the abrasive particles or not greater than about 75%, not greater than about 70%, not greater than about 65%, not greater than about 60% of the average particle size of the abrasive particles.

Embodiment 61

The abrasive article of Embodiment 55, wherein the bonding layer comprise an average thickness of at least about 1 micron or at least about 2 microns or at least about 3 microns.

Embodiment 62

The abrasive article of Embodiment 55, wherein the bonding layer comprises an average thickness of not greater than about 60 microns or not greater than about 50 microns or not greater than about 40 microns or not greater than about 30 microns.

Embodiment 63

A method for forming an abrasive article comprising providing a substrate comprising an elongated body; and depositing a slurry comprising a mixture of precursor material and abrasive particles onto the elongated body to form a coated substrate, wherein during depositing the content of abrasive particles deposited onto the substrate is varied.

Embodiment 64

The method of Embodiment 63, wherein the content of abrasive particles is varied by controlling at least one deposition characteristic selected from the group consisting of the slurry flow rate, the opening size of the deposition port, the volume of slurry deposited per unit of time, the number of deposition ports actively depositing slurry, direction of the deposition ports, the translating speed of the substrate, or any combination thereof.

Embodiment 65

The method of Embodiment 64, wherein the content of abrasive particles is varied by controlling the slurry flow rate.

Embodiment 65

The method of Embodiment 64, wherein the content of abrasive particles is varied by controlling the direction of the deposition ports.

Embodiment 66

The method of Embodiment 63, wherein the content of abrasive particles is varied by using a deflection plate to control the direction of the flow of the slurry from a deposition port.

Embodiment 67

The method of Embodiment 66, wherein the deflection plate is in direct contact with the flow of slurry from the deposition port.

Embodiment 68

The method of Embodiment 66, wherein the deflection plate is adjacent to the flow of slurry from the deposition port.

Embodiment 69

The method of Embodiment 66, wherein the deflection plate is periodically in contact with the flow of slurry form the deposition port.

Embodiment 70

The method of Embodiment 66, wherein the deflection plate is configured to be attached to or mounted from a reservoir.

Embodiment 71

The method of Embodiment 66, wherein the deflection plate is mounted on a base.

Embodiment 72

The method of Embodiment 71, wherein the base is adjustable in a vertical or horizontal direction relative to the substrate.

Embodiment 73

The method of Embodiment 71, wherein a mechanism of rotatory or swinging motion is applied to the deflection plate such that the deflection plate moves in and out of the flow of the slurry.

Embodiment 74

The method of Embodiment 66, wherein the flow of the slurry is periodically deflected away from the substrate.

Embodiment 75

The method of Embodiment 63, wherein the content is varied by changing the flow rate of the slurry between a minimum and maximum value to alter the content of abrasive particles attached to the substrate.

Embodiment 76

The method of Embodiment 63, further comprising treating the coated substrate to change the precursor material into a tacking layer or a bonding layer.

EXAMPLE 1

A first conventional sample (Sample C1) was formed by obtaining a length of high strength carbon steel wire for use as a substrate. The high strength carbon steel wire had a brass coating layer and an average diameter of approximately 100 microns. The wire was translated through a deposition region at a rate of 30-50 m/min, wherein a slurry was deposited onto the wire. The slurry included diamond commercially available as 8-16 micron diamond from Saint-Gobain Corporation, a powder precursor material commercially available as 99.0% 1-2 micron tin metal powder from Atlantic Equipment Corporation, and further included a chloride-based salt additive and a viscosity modifier as provided in Table 1. During the deposition process, the flow rate of the slurry was approximately constant using a pump rate as provided in Table 1.

Details of the slurry and the certain forming process parameters are provided below in Table 1. After deposition, the slurry-coated wire was heat treated at a temperature of 800° F. to 1100° F. for a duration of approximately 0.1-1 second. The abrasive article was allowed to cool as it was translated, washed, and covered with 3-4 um of electroplated Ni then rinsed and coiled on a receiving spool.

TABLE 1

| Slurry Component | Content (wt %) | Process Conditions | Sample C1 | Sample S1 |
|---|---|---|---|---|
| Diamond | 6-8 | Translation speed (m/min) | 50 | 30 |
| Tin | 3-7 | Plating tank current (Amps) | 31 | 18.7 |
| Water | 62-66 | Nickel thickness (microns) | 3.5 | 3.5 |
| Chloride additive | 15-20 | Heat gun temperature (° F.) | 1000 | 875 |
| Viscosity modifier | 8-12 | Residence time in heat gun (sec.) | 0.2 | 0.3 |
| | | Pump Rate (rpm) | 350 | 60 |

A second representative sample (Sample S1) was formed using the same process used to form Sample C1, except that certain conditions were altered as provided in Table 1. The slurry used to form Sample C1 and S1 were the same. The difference in the plating tank current is to account for the difference in translation speed so that the same average nickel thickness is formed on the abrasive article. The difference in the heat gun temperature between Samples C1 and S1 is also to accommodate the difference in translation speeds. The pump was a Cole-Parmer Instruments Masterflex pump with a 4-head roller rotor. The tubing was Masterflex Tygon E-Lab (E-3603) pump tubing (LS-17). The pump and tubing are configured to provide 2.8 ml per revolution of the 4-head roller rotor.

Figure 4:
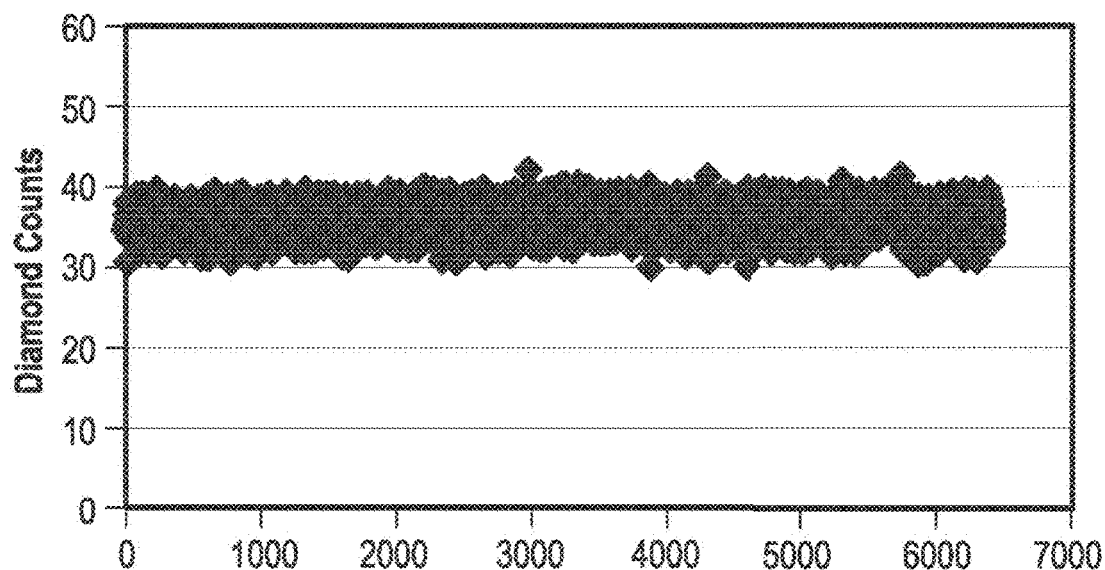
FIG. 4 includes a plot of the abrasive particle content versus length for a portion of a conventional sample.
Figure 5:
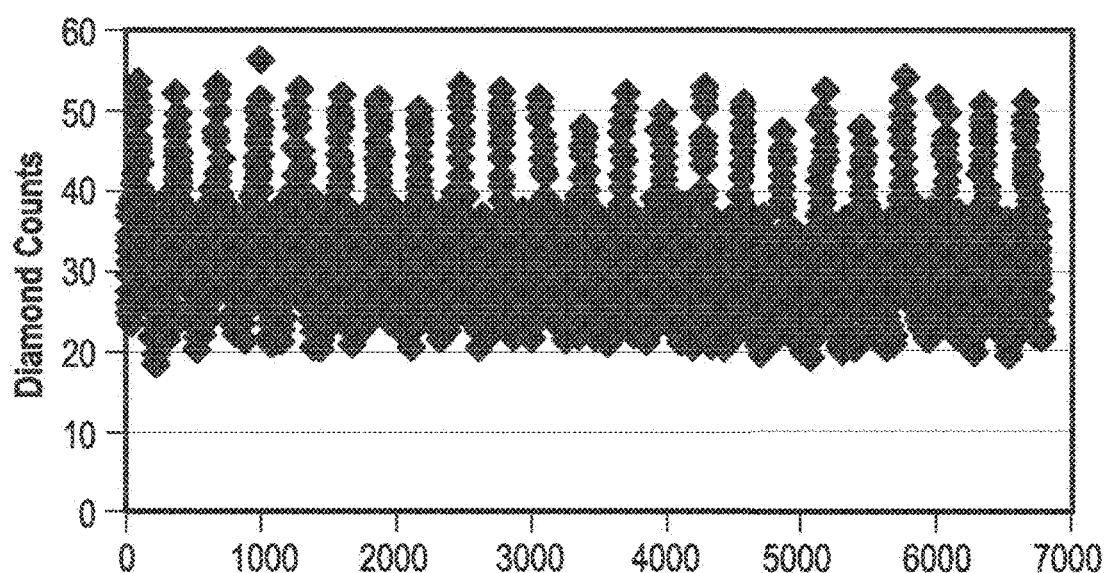
FIG. 5 includes a plot of the abrasive particle content versus length for a portion of a representative sample.

Using the APCS, the content of the abrasive particles along the lengths of each of the samples (C1 and S1) was evaluated. FIG. 4 includes a plot of the abrasive particle content versus length for a portion of the Sample C1. FIG. 5 includes a plot of the abrasive particle content versus length for a portion of the Sample S1.

Samples C1 and S1 were tested on a Takatori K2 wire saw machine using 8 wires, at a wire speed of approximately 10 m/s, using a new wire supply of approximately 0.2 m/min, with a wire cycle time or approximately 3 s/20 s/3 s (i.e., acceleration/time at constant speed/deceleration), a feed rate of approximately 1 mm/min, to a total cut depth of 8 mm. The cut depth was measured using a microscope (Olympus DSX500). The cut depth was measured on both sides of the cut material (wire entry and exit) using 5× magnification. Both cut depth values were averaged and compared.

Figure 6:
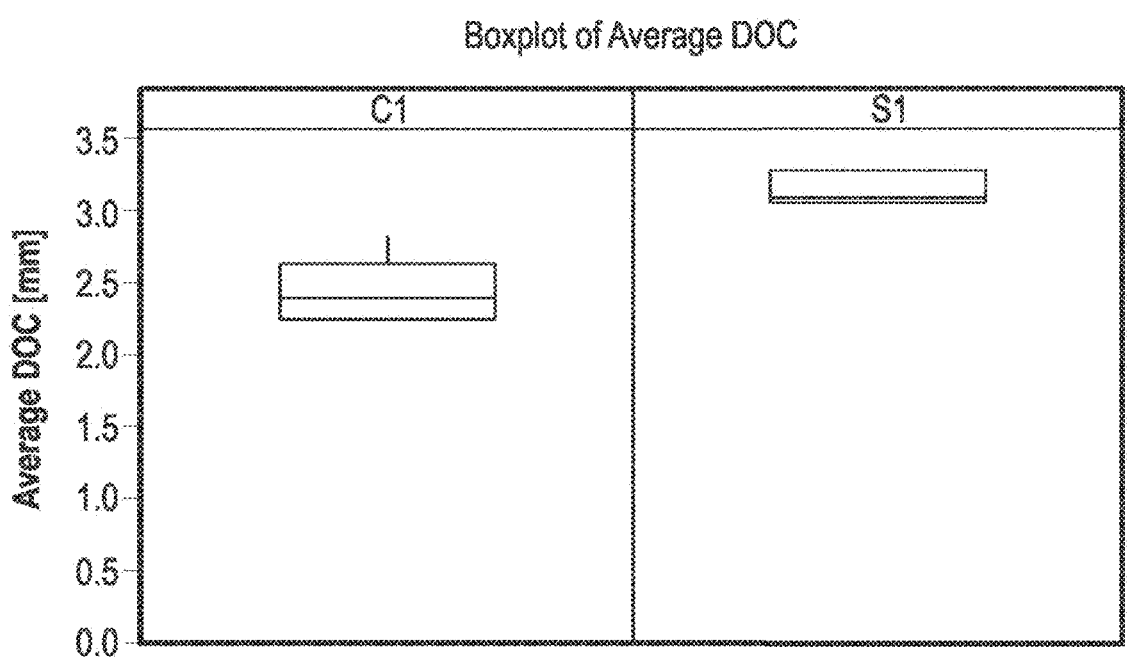
FIG. 6 includes a box plot for a cutting test conducted with the conventional sample and representative sample.

FIG. 6 includes a plot showing the average depth of cut achieved for each of the samples according to the test conditions noted above. As illustrated, the average depth of cut achieved by Sample S1 was significantly improved compared to Sample C1.

EXAMPLE 2

A third representative sample (Sample S2) was formed using the same process used to form Sample C1, except that the deposition characteristic was altered. The slurry used to form Sample C1 and S1 were the same. The diamond counts of Sample S2 were varied by changing the direction of the deposition ports to deflect slurry away from the substrate periodically to alter the content of abrasive particles attached to the substrate. This alteration created sections of wire with high diamond counts when slurry was not being deflected and sections of wire with lower diamond counts when slurry was deflected.

Figure 7:
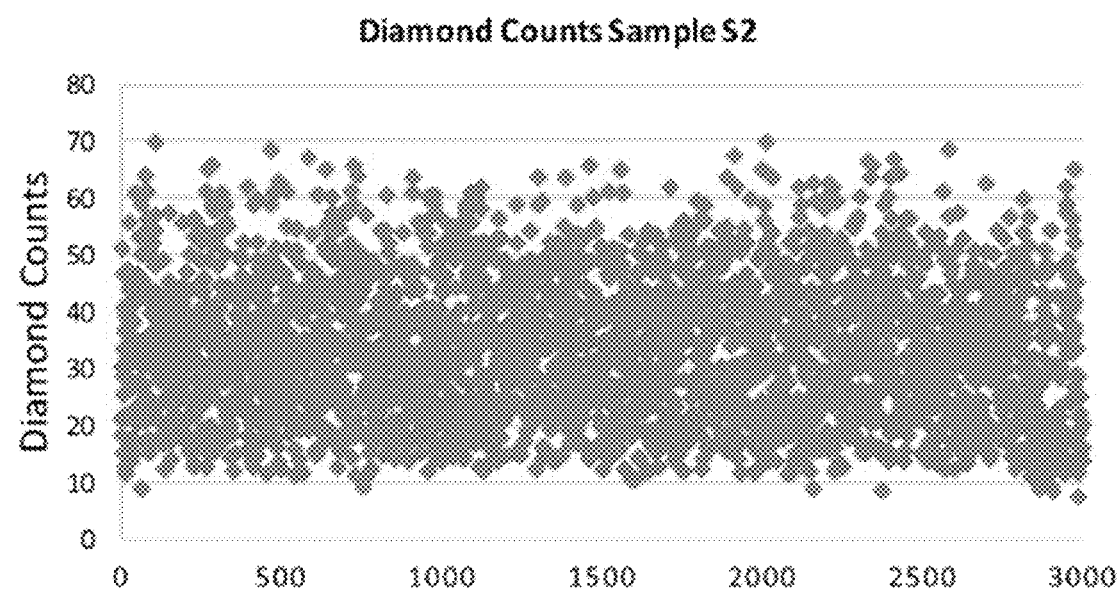
FIG. 7 includes a plot of the abrasive particle content versus length for a portion of a representative sample.

Using the APCS, the content of the abrasive particles along the length of Sample S2 was evaluated. FIG. 7 includes a plot of the abrasive particle content versus length for a portion of the Sample S2. As can be seen in FIG. 7 vs. FIG. 4, the content difference (ΔC) of Sample C1 has a much smaller variation of diamond counts (approx. 10 counts), whereas Sample S2 has a much larger variation of diamond counts (approx. 60 counts).

Samples C1 and S2 were tested on a Takatori K2 wire saw machine using 8 wires, at a wire speed of approximately 10 m/s, using a new wire supply of approximately 0.2 m/min, with a wire cycle time or approximately 3 s/20 s/3 s (i.e., acceleration/time at constant speed/deceleration), a feed rate of approximately 1 mm/min, to a total cut depth of 8 mm. The cut depth was measured using a microscope (Olympus DSX500). The cut depth was measured on both sides of the cut material (wire entry and exit) using 5× magnification. Both cut depth values were averaged and compared.

Figure 8:
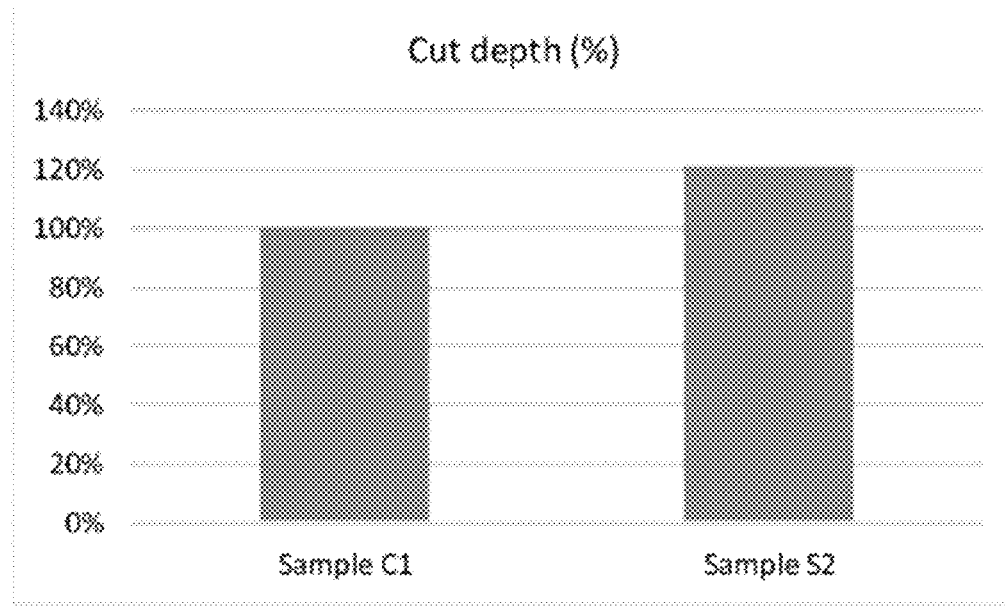
FIG. 8 is a bar graph showing cut depth (%) for a cutting test conducted with the conventional sample and representative sample.

FIG. 8 includes a plot showing the cut depth (%) achieved for each of the samples C1 and S2 according to the test conditions noted above. As illustrated, the cut depth (%) achieved by Sample S2 was significantly improved compared to Sample C1.

Figure 9:
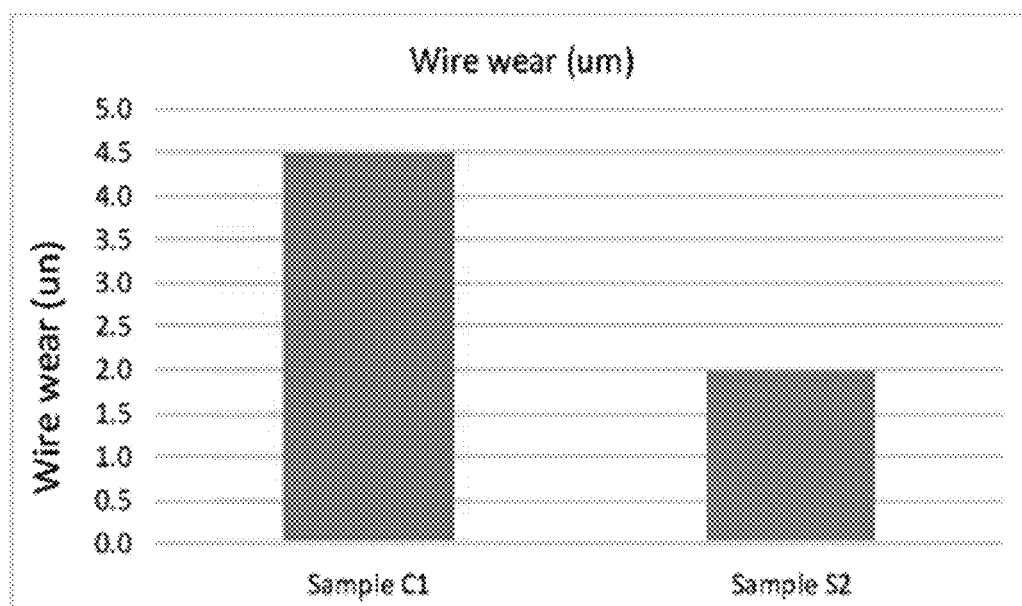
FIG. 9 is a bar graph showing wire wear for a cutting test conducted with the conventional sample and representative sample.

FIG. 9 includes a plot showing the wire wear (μm) achieved for each of the samples C1 and S2 according to the test conditions noted above. As illustrated, the wire wear (μm) achieved by Sample S2 was significantly lower when compared to Sample C1.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
a substrate comprising an elongated body; and
abrasive particles attached to the elongated body, wherein the abrasive particles define a varying content between a local minimum content and a local maximum content, and wherein the local minimum content is at least 5 counts and a content difference (ΔC) between the local minimum content and the local maximum content is at least 14 counts, wherein the content of the abrasive particles oscillates along at least a portion of the length of the body between the local minimum and the local maximum value, and wherein the length along the elongated body between a local minimum and a local maximum defines a cycle, and wherein a cycle is at least 0.01% and not greater than 50% of the total length.

2. The abrasive article of claim 1, further comprising:
a first abrasive region comprising abrasive particles overlying the elongated body, wherein the first abrasive region comprises a first content of abrasive particles (C1), wherein C1>0;
a second abrasive region comprising abrasive particles overlying the elongated body, wherein the second abrasive region comprises a second content of abrasive particles (C2), wherein C2>0; and
a content difference (ΔC) between the first content and the second content of at least 14 counts.

3. The abrasive article of claim 1 wherein the body includes an uncovered region.

4. The abrasive article of claim 1, wherein the content difference (ΔC) is at least 15 counts.

5. The abrasive article of claim 1, wherein the content difference (ΔC) is not greater than 200 counts.

6. The abrasive article of claim 2 wherein C1 corresponds to a local maximum content and C2 corresponds to a local minimum content.

7. The abrasive article of claim 1, wherein the elongated body is free of an uncovered region.

8. The abrasive article of claim 1, wherein the content of the abrasive particles oscillates according to a repetitive pattern.

9. The abrasive article of claim 1, wherein the content of the abrasive particles oscillates continuously between the minimum and maximum values.

10. The abrasive article of claim 1, wherein the varying content of the abrasive particles oscillates for at least 50% of the total length of the substrate.

11. The abrasive article of claim 2, wherein the body includes at least a first abrasive region having a first content of abrasive particles (C1) and defining a first local maximum, a second abrasive region having a second content of abrasive particles (C2) and defining a first local minimum, and a third abrasive region having a third content of abrasive particles (C3), wherein C1>C3>C2.

12. The abrasive article of claim 11, further comprising a fourth abrasive region comprising a fourth content of abrasive particles (C4) and defining a second local maximum spaced apart from the first local maximum, and wherein C4>C3>C2.

13. The abrasive article of claim 12, wherein the length along the elongated body between the first abrasive region and the fourth abrasive region defines a cycle and further comprising at least 1 cycle and not greater than $1\times10^{10}$ cycles.

14. The abrasive article of claim 1, wherein the substrate comprises a material selected from the group consisting of metal, metal alloys, ceramic, glass, and a combination thereof.

15. The abrasive article of claim 1, wherein the substrate consists essentially of a wire.

16. The abrasive article of claim 1, wherein the abrasive particles comprises a material selected from the group of materials consisting of oxides, carbides, nitrides, borides, oxynitrides, oxyborides, diamond, or any combination thereof.

17. The abrasive article of claim 1, wherein the abrasive particles consist essentially of diamond.

18. An abrasive article comprising:
a substrate comprising an elongated body; and
abrasive particles attached to the elongated body, wherein the abrasive particles define a varying content between a local minimum content and a local maximum content, and wherein the local minimum content is at least 5 counts and a content difference ($\Delta C$) between the local minimum content and the local maximum content is at least 14 counts, wherein the abrasive particles are arranged in a random arrangement relative to each other, and wherein the length along the elongated body between a local minimum and a local maximum defines a cycle, and wherein a cycle is at least 0.01% and not greater than 50% of the total length.

19. The abrasive article of claim 18, wherein the body includes at least a first abrasive region having a first content of abrasive particles (C1) and defining a first local maximum, a second abrasive region having a second content of abrasive particles (C2) and defining a first local minimum, and a third abrasive region having a third content of abrasive particles (C3), wherein C1>C3>C2.

20. The abrasive article of claim 19, further comprising a fourth abrasive region comprising a fourth content of abrasive particles (C4) and defining a second local maximum spaced apart from the first local maximum, and wherein C4>C3>C2.

21. The abrasive article of claim 18, the content of the abrasive particles oscillates according to a repetitive pattern.

22. The abrasive article of claim 18 wherein the body includes an uncovered region.

23. An abrasive article comprising:
a substrate comprising an elongated body; and
abrasive particles attached to the elongated body, wherein the abrasive particles define a varying content between a local minimum content and a local maximum content, and wherein the local minimum content is at least 5 counts and a content difference ($\Delta C$) between the local minimum content and the local maximum content is at least 14 counts, further comprising alternating abrasive regions defining a series of alternating local minimum and local maximum abrasive contents extending along the length of the elongated body, and wherein the length along the elongated body between a local minimum and a local maximum defines a cycle, and wherein a cycle is at least 0.01% and not greater than 50% of the total length.

24. The abrasive article of claim 23, wherein the body includes at least a first abrasive region having a first content of abrasive particles (C1) and defining a first local maximum, a second abrasive region having a second content of abrasive particles (C2) and defining a first local minimum, and a third abrasive region having a third content of abrasive particles (C3), wherein C1>C3>C2.

25. The abrasive article of claim 24, further comprising a fourth abrasive region comprising a fourth content of abrasive particles (C4) and defining a second local maximum spaced apart from the first local maximum, and wherein C4>C3>C2.

26. The abrasive article of claim 23, the content of the abrasive particles oscillates according to a repetitive pattern.

27. The abrasive article of claim 23 wherein the body includes an uncovered region.

* * * * *